United States Patent
Deysarkar et al.

(10) Patent No.: US 11,248,163 B2
(45) Date of Patent: *Feb. 15, 2022

(54) COMPOSITIONS AND METHODS FOR CROSS-LINKING HYDRATABLE POLYMERS USING PRODUCED WATER

(71) Applicant: PfP INDUSTRIES, LLC, Houston, TX (US)

(72) Inventors: Asoke Kumar Deysarkar, Houston, TX (US); Nikhil Patel, Houston, TX (US); Nathalie Rasolomiarantsoa, Houston, TX (US); James Nguyen, Houston, TX (US); Rajendra Ghimire, Houston, TX (US); Michael J. Callanan, Houston, TX (US); Robert Ray McDaniel, Houston, TX (US); Madhukar Chetty, Houston, TX (US)

(73) Assignee: PfP INDUSTRIES LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,718

(22) Filed: Nov. 3, 2020

(65) Prior Publication Data

US 2021/0214604 A1 Jul. 15, 2021

Related U.S. Application Data

(63) Continuation of application No. 16/101,835, filed on Aug. 13, 2018, now Pat. No. 10,870,791.

(60) Provisional application No. 62/545,368, filed on Aug. 14, 2017.

(51) Int. Cl.
| | |
|---|---|
| *C09K 8/68* | (2006.01) |
| *E21B 43/26* | (2006.01) |
| *C09K 8/90* | (2006.01) |
| *C09K 8/72* | (2006.01) |
| *C09K 8/88* | (2006.01) |
| *E21B 43/267* | (2006.01) |

(52) U.S. Cl.
CPC .............. *C09K 8/685* (2013.01); *C09K 8/725* (2013.01); *C09K 8/885* (2013.01); *C09K 8/887* (2013.01); *C09K 8/90* (2013.01); *E21B 43/26* (2013.01); *E21B 43/267* (2013.01)

(58) Field of Classification Search
CPC .......... C09K 8/685; C09K 8/90; C09K 8/887; C09K 8/035; C09K 8/68; C09K 2208/26; E21B 43/26; E21B 43/267; E21B 43/16; E21B 43/25

See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,873,251 A | 9/1956 | Jones, Jr. | |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |

(Continued)

FOREIGN PATENT DOCUMENTS

| | | |
|---|---|---|
| WO | 2013124003 A1 | 8/2013 |
| WO | 2014191389 A1 | 4/2014 |
| WO | 2018025010 A1 | 2/2018 |

OTHER PUBLICATIONS

Lower Cost Methods for Improved Oil Recovery (IOR) Via Surfactant Flooding, William A. Goddard III; Yongchun Tang ; Patrick Shuler; Mario Blanco ; Seung Soon Jang ; Shiang-Tai Lin ; Prabal Maiti ; Yongfu Wu ; Stefan Iglauer; Xiaohang Zhang.
U.S. Appl. No. 12/075,461, filed Mar. 11, 2008, Gatlin et al., 166.

*Primary Examiner* — Zakiya W Bates
(74) *Attorney, Agent, or Firm* — Robert W. Strozier

(57) ABSTRACT

Fracturing fluid compositions including a base fluid including a high TDS produced and/or flow back water, brackish water, RO reject water, clear brine, and mixtures thereof with or without added fresh water and systems, and methods for making and using same, where the method includes: (a) adding a first buffer to adjust the pH of a base fluid to an acidic pH, (b) adding a hydratable polymer or polymer slurry to the base fluid to form a hydratable polymer fracturing fluid, (c) adding a cross-linking composition to the hydratable polymer fracturing fluid to form a pre-cross-linked fracturing fluid, and (d) if needed, adding a second buffer to the pre-cross-linked fracturing fluid to adjust the pH of the pre-cross-linked fracturing fluid to form a viscosified fracturing fluid having a crosslinked structure.

27 Claims, 9 Drawing Sheets

(56) References Cited

U.S. PATENT DOCUMENTS

| | | | |
|---|---|---|---|
| 4,461,716 A | 7/1984 | Barbarin et al. ............... 252/307 |
| 4,462,718 A | 7/1984 | McLaughlin et al. |
| 4,479,041 A | 10/1984 | Fenwick et al. ............ 200/81 R |
| 4,506,734 A | 3/1985 | Nolte ........................ 166/308.1 |
| 4,514,309 A | 4/1985 | Wadhwa ...................... 507/211 |
| 4,541,935 A | 9/1985 | Constien et al. ............. 507/225 |
| 4,549,608 A | 10/1985 | Stowe et al. ............... 166/280.1 |
| 4,561,985 A | 12/1985 | Glass, Jr. ..................... 507/108 |
| 4,623,021 A | 11/1986 | Stowe ......................... 166/250.1 |
| 4,654,266 A | 3/1987 | Kachnik ....................... 428/403 |
| 4,657,081 A | 4/1987 | Hodge ....................... 166/380.5 |
| 4,660,643 A | 4/1987 | Perkins ......................... 166/283 |
| 4,683,068 A | 7/1987 | Kucera ......................... 507/201 |
| 4,686,052 A | 8/1987 | Baranet et al. .................. 507/244 |
| 4,695,389 A | 9/1987 | Kubala ......................... 507/244 |
| 4,705,113 A | 11/1987 | Perkins ......................... 166/302 |
| 4,714,115 A | 12/1987 | Uhri .......................... 166/308.1 |
| 4,718,490 A | 1/1988 | Uhri ............................. 166/281 |
| 4,724,905 A | 2/1988 | Uhri .......................... 166/250.1 |
| 4,725,372 A | 2/1988 | Teot et al. .................... 507/129 |
| 4,739,834 A | 4/1988 | Peiffer et al. ............... 166/308.4 |
| 4,741,401 A | 5/1988 | Walles et al. ................. 166/300 |
| 4,748,011 A | 5/1988 | Baize ........................... 423/228 |
| 4,779,680 A | 10/1988 | Sydansk ....................... 166/300 |
| 4,795,574 A | 1/1989 | Syrinek et al. ................. 507/238 |
| 4,817,717 A | 4/1989 | Jennings, Jr. et al. ........ 166/278 |
| 4,830,106 A | 5/1989 | Uhri .......................... 166/250.1 |
| 4,846,277 A | 7/1989 | Khalil et al. ................. 166/280.1 |
| 4,848,468 A | 7/1989 | Hazlett et al. ................. 166/300 |
| 4,852,650 A | 8/1989 | Jennings, Jr. et al. ..... 166/250.1 |
| 4,869,322 A | 9/1989 | Vogt, Jr. et al. ............ 166/280.1 |
| 4,892,147 A | 1/1990 | Jennings, Jr. et al. ..... 166/280.2 |
| 4,926,940 A | 5/1990 | Stromswold .................. 166/247 |
| 4,938,286 A | 7/1990 | Jennings, Jr. ............... 166/280.1 |
| 4,978,512 A | 12/1990 | Dillon ......................... 423/226 |
| 4,985,154 A | 1/1991 | Balzer et al. |
| 5,005,645 A | 4/1991 | Jennings, Jr. et al. ..... 166/280.1 |
| 5,024,276 A | 6/1991 | Borchardt ................... 166/308.6 |
| 5,067,556 A | 11/1991 | Fudono et al. ............. 62/196.4 |
| 5,074,359 A | 12/1991 | Schmidt ...................... 166/280.1 |
| 5,074,991 A | 12/1991 | Weers ......................... 208/236 |
| 5,082,579 A | 1/1992 | Dawson ........................ 507/211 |
| 5,106,518 A | 4/1992 | Cooney et al. ................. 507/21 |
| 5,110,486 A | 5/1992 | Manalastas et al. ........... 507/260 |
| 5,169,411 A | 12/1992 | Weers ............................ 44/421 |
| 5,224,546 A | 7/1993 | Smith et al. ................... 166/300 |
| 5,228,510 A | 7/1993 | Jennings, Jr. et al. ........ 166/263 |
| 5,246,073 A | 9/1993 | Sandiford et al. ............. 166/295 |
| 5,259,455 A | 11/1993 | Nimerick et al. ......... 166/308.5 |
| 5,310,002 A | 5/1994 | Blauch et al. |
| 5,330,005 A | 7/1994 | Card et al. ................. 166/280.2 |
| 5,342,530 A | 8/1994 | Aften et al. .................. 252/8.551 |
| 5,347,004 A | 9/1994 | Rivers et al. ................. 544/180 |
| 5,363,919 A | 11/1994 | Jennings, Jr. ............... 166/308.1 |
| 5,402,846 A | 4/1995 | Jennings, Jr. et al. ........ 166/259 |
| 5,411,091 A | 5/1995 | Jennings, Jr. ............... 166/280.1 |
| 5,424,284 A | 6/1995 | Patel et al. ..................... 507/129 |
| 5,439,055 A | 8/1995 | Card et al. ................. 166/280.2 |
| 5,462,721 A | 10/1995 | Pounds et al. ................. 423/226 |
| 5,465,792 A | 11/1995 | Dawson et al. ............... 166/295 |
| 5,472,049 A | 12/1995 | Chaffee et al. .............. 166/250.1 |
| 5,482,116 A | 1/1996 | El-Rabaa et al. ........... 166/250.1 |
| 5,488,083 A | 1/1996 | Kinsey, III et al. ........... 507/211 |
| 5,497,831 A | 3/1996 | Hainey et al. ............... 166/308.1 |
| 5,501,275 A | 3/1996 | Card et al. ................. 166/280.2 |
| 5,549,840 A | 8/1996 | Mondin et al. |
| 5,551,516 A | 9/1996 | Norman et al. ............ 166/308.2 |
| 5,558,171 A | 9/1996 | McGlothlin et al. |
| 5,593,958 A | 1/1997 | Mondin et al. |
| 5,599,785 A | 2/1997 | Mondin et al. |
| 5,610,130 A | 3/1997 | Barbara et al. |
| 5,624,886 A | 4/1997 | Dawson et al. ............... 507/217 |
| 5,635,458 A | 6/1997 | Lee et al. ..................... 507/240 |
| 5,649,596 A | 7/1997 | Jones et al. .................. 166/300 |
| 5,669,447 A | 9/1997 | Walker et al. ................ 166/300 |
| 5,674,377 A | 10/1997 | Sullivan, III et al. .... 208/208 R |
| 5,688,478 A | 11/1997 | Pounds et al. ................. 423/228 |
| 5,693,837 A | 12/1997 | Smith et al. .................. 556/148 |
| 5,711,396 A | 1/1998 | Joerg et al. .................... 180/444 |
| 5,716,925 A | 2/1998 | Mondin et al. |
| 5,722,490 A | 3/1998 | Ebinger ........................ 166/281 |
| 5,725,470 A | 3/1998 | Lazarowitz et al. |
| 5,731,281 A | 3/1998 | Mondin et al. |
| 5,741,760 A | 4/1998 | Mondin et al. |
| 5,744,024 A | 4/1998 | Sullivan, III et al. ........ 208/236 |
| 5,755,286 A | 5/1998 | Ebinger ........................ 166/281 |
| 5,759,983 A | 6/1998 | Mondin et al. |
| 5,763,386 A | 6/1998 | Mondin et al. |
| 5,775,425 A | 7/1998 | Weaver et al. ................ 166/276 |
| 5,776,880 A | 7/1998 | Mondin et al. |
| 5,787,986 A | 8/1998 | Weaver et al. ............ 166/280.2 |
| 5,806,597 A | 9/1998 | Tjon-Joe-Pin et al. ....... 166/300 |
| 5,807,812 A | 9/1998 | Smith et al. ................... 507/238 |
| 5,830,831 A | 11/1998 | Chan et al. |
| 5,833,000 A | 11/1998 | Weaver et al. ................ 166/276 |
| 5,853,048 A | 12/1998 | Weaver et al. ................ 166/279 |
| 5,854,193 A | 12/1998 | Mondin et al. |
| 5,861,367 A | 1/1999 | Blanvalet et al. |
| 5,871,049 A | 2/1999 | Weaver et al. ................ 166/276 |
| 5,874,386 A | 2/1999 | Chan et al. |
| 5,877,127 A | 3/1999 | Card et al. ..................... 507/273 |
| 5,908,073 A | 6/1999 | Nguyen et al. ................ 166/276 |
| 5,908,814 A | 6/1999 | Patel et al. ..................... 507/131 |
| 5,952,281 A | 9/1999 | Mondin et al. |
| 5,964,295 A | 10/1999 | Brown et al. .............. 166/308.2 |
| 5,977,032 A | 11/1999 | Chan |
| 5,979,557 A | 11/1999 | Card et al. ..................... 166/300 |
| 5,980,845 A | 11/1999 | Cherry ........................... 423/229 |
| 5,985,814 A | 11/1999 | Zocchi et al. |
| 6,000,412 A | 12/1999 | Chan et al. |
| 6,016,871 A | 1/2000 | Burts, Jr. ....................... 166/300 |
| 6,017,868 A | 1/2000 | Mondin et al. |
| 6,020,296 A | 2/2000 | Mertens et al. |
| 6,035,936 A | 3/2000 | Whalen ..................... 166/308.5 |
| 6,047,772 A | 4/2000 | Weaver et al. ................ 166/276 |
| 6,054,417 A | 4/2000 | Graham et al. ............... 507/238 |
| 6,059,034 A | 5/2000 | Rickards et al. .......... 166/280.2 |
| 6,060,436 A | 5/2000 | Snyder et al. ................ 507/266 |
| 6,069,118 A | 5/2000 | Hinkel et al. ................. 507/277 |
| 6,090,754 A | 7/2000 | Chan et al. |
| 6,112,814 A | 9/2000 | Chan et al. |
| 6,123,394 A | 9/2000 | Jeffrey ............................. 299/16 |
| 6,133,205 A | 10/2000 | Jones .............................. 507/276 |
| 6,147,034 A | 11/2000 | Jones et al. .................... 507/238 |
| 6,162,449 A | 12/2000 | Maier et al. ................... 424/401 |
| 6,162,766 A | 12/2000 | Muir et al. ..................... 507/267 |
| 6,169,058 B1 | 1/2001 | Le et al. ......................... 507/222 |
| 6,191,090 B1 | 2/2001 | Mondin et al. |
| 6,228,812 B1 | 5/2001 | Dawson et al. ............... 507/221 |
| 6,247,543 B1 | 6/2001 | Patel et al. ...................... 175/64 |
| 6,267,938 B1 | 7/2001 | Warrender et al. ........... 423/226 |
| 6,283,212 B1 | 9/2001 | Hinkel et al. ................... 166/279 |
| 6,291,405 B1 | 9/2001 | Lee et al. ....................... 507/136 |
| 6,330,916 B1 | 12/2001 | Rickards et al. .......... 166/280.2 |
| 6,436,880 B1 | 8/2002 | Frenier |
| 6,725,931 B2 | 4/2004 | Nguyen et al. ............ 166/280.2 |
| 6,756,345 B2 | 6/2004 | Pakulski et al. .............. 507/246 |
| 6,793,018 B2 | 9/2004 | Dawson et al. ............... 166/300 |
| 6,832,650 B2 | 12/2004 | Nguyen et al. ............... 166/279 |
| 6,875,728 B2 | 4/2005 | Gupta et al. ................... 507/240 |
| 6,911,417 B2 | 6/2005 | Chan et al. |
| 7,012,043 B2 | 3/2006 | Klein et al. |
| 7,087,554 B2 | 8/2006 | Youngson et al. |
| 7,140,433 B2 | 11/2006 | Gatlin et al. ............... 166/250.01 |
| 7,268,100 B2 | 9/2007 | Kippie et al. .................. 507/244 |
| 7,350,579 B2 | 4/2008 | Gatlin et al. ................ 166/308.3 |
| 7,601,675 B2 | 10/2009 | Poelker et al. |
| 7,989,404 B2 | 8/2011 | Kakadjian et al. ............ 507/261 |
| 8,097,567 B2 | 1/2012 | Wilson, Jr. |
| 9,034,801 B2 | 5/2015 | Merli et al. |
| 2002/0049256 A1 | 4/2002 | Bergeron, Jr. ................ 514/674 |
| 2002/0165308 A1 | 11/2002 | Kinniard et al. ............. 524/492 |
| 2003/0166472 A1 | 9/2003 | Pursley et al. |
| 2003/0220204 A1 | 11/2003 | Baran, Jr. et al. ............. 507/200 |

(56) References Cited

U.S. PATENT DOCUMENTS

| | | | |
|---|---|---|---|
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0125536 A1 | 6/2007 | Acock et al. | |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0039345 A1 | 2/2008 | Kippie et al. | 507/213 |
| 2008/0269082 A1 | 10/2008 | Wilson et al. | |
| 2008/0287323 A1 | 11/2008 | Li et al. | |
| 2010/0224365 A1 | 9/2010 | Adad | |
| 2010/0248997 A1 | 9/2010 | Li et al. | |
| 2010/0307757 A1 | 12/2010 | Blow et al. | |
| 2011/0017677 A1 | 1/2011 | Evans | |
| 2011/0082057 A1 | 4/2011 | Zhang et al. | |
| 2012/0125617 A1 | 5/2012 | Gu et al. | |
| 2012/0305254 A1 | 12/2012 | Chen et al. | |
| 2013/0153233 A1 | 6/2013 | Bell et al. | |
| 2013/0157905 A1 | 6/2013 | Saini et al. | |
| 2013/0213657 A1 | 8/2013 | Dobson, Jr. et al. | |
| 2013/0333888 A1 | 12/2013 | Rincon-Torres | |
| 2014/0116710 A1 | 5/2014 | Naser-El-Din et al. | |
| 2014/0158354 A1 | 6/2014 | Kumar et al. | |
| 2014/0174742 A1 | 6/2014 | Mirakyan et al. | |
| 2014/0194327 A1 | 7/2014 | Hutchings et al. | |
| 2014/0196904 A1 | 7/2014 | Fontenelle et al. | |
| 2014/0374104 A1 | 12/2014 | Seth et al. | |
| 2015/0013987 A1 | 1/2015 | Underwood et al. | |
| 2015/0068747 A1 | 3/2015 | Hwang et al. | |
| 2015/0129231 A1 | 5/2015 | Vittur et al. | |
| 2015/0299554 A1 | 10/2015 | Pakulski et al. | |
| 2015/0344767 A1 | 12/2015 | Lei et al. | |
| 2015/0353807 A1 | 12/2015 | Witham et al. | |
| 2018/0030335 A1 | 2/2018 | Mcewen et al. | |

COMPOSITIONS AND METHODS FOR CROSS-LINKING HYDRATABLE POLYMERS USING PRODUCED WATER

RELATED APPLICATIONS

The present application claims priority to and the benefit of U.S. Provisional Application Ser. No. 62/545,368, filed 14 Aug. 2017, incorporated by reference through the operation of the closing paragraph of the specification.

BACKGROUND OF THE DISCLOSURE

1. Field of the Disclosure

Embodiments of the present disclosure relate to compositions, systems, and methods for making and using the compositions, where the compositions include a crosslinked fracturing fluid including a base fluid comprising a high total dissolved solids (TDS) produced water, a TDS flow back water, a brackish water, a reverse osmosis (RO) reject water, a clear brine, and mixtures thereof. Embodiments of the present disclosure also relate to low concentration cross-linked polymer fracturing fluid and methods for making and using same with or without the use of high TDS produced water.

In particular, embodiments of the present disclosure relate to compositions, systems, and methods for making and using the compositions, where the compositions include a cross-linked fracturing fluids including a base fluid comprising a high TDS produced water, a TDS flow back water, a brackish water, a RO reject water, a clear brine, and mixtures or combinations thereof and in certain embodiments, the base fluid also includes fresh water. The methods include: (a) adding a first buffer to the base fluid to lower a pH of the base fluid to form a low pH base fluid, (b) adding a hydratable polymer or a hydratable polymer slurry to the base fluid to form a hydrated hydratable polymer fracturing fluid, (c) adding a crosslinking agent to the hydrated hydratable polymer fracturing fluid to form a pre-cross-linked fracturing fluid, and optionally (d) adding a second buffer to the pre-cross-linked fracturing fluid to increase a pH of the pre-cross-linked fracturing fluid to form a viscosified fracturing fluid. In certain embodiments, the methods also include the step of adding a proppant to the fracturing fluid. In other embodiments, the methods include fracturing a formation with the fracturing fluid of this disclosure, where the fracturing methods may include injecting the fracturing fluid with the proppant or injecting a proppant free fracturing fluid followed by injecting a proppant fluid.

2. Description of the Related Art

Hydraulic fracturing is a process in which proppant is transported at a very high pressure along with other necessary reagents to form fracture or fissures in a formation and to prop-open the fractures or fissures in the formation. The most common way of transporting proppant is by suspending the proppant in a viscosified fluid. The fluid could be either viscous (linear gel or crosslinked) or thin as in a "slick water frac". The key is to pump at a higher rate than may leak-off (flow out into the reservoir rock). When this happens there is a build-up of pressure at the face exposed to the fracturing fluid. This pressure will continue to increase until it exceeds the forces binding the rock together. At this point the formation rock will "fracture". Once the fracture is initiated, continued pumping will cause the fracture to grow in length, width and height.

After fracture initiation and during the period of fracture development and growth, solids called proppants are added to the fluid being pumped forming a slurry so that the proppants may be deposited in the created fracture. Multiple stages of slurry injection at increasing pumping rates are common. It is the distribution of the solids in the fracture that will keep the fracture propped open after pumping has ceased and the formation tries to go back to its unstressed position. This "propped" fracture has a conductivity that is significantly higher that the formation rock surrounding it and therefore represents a highly conductive passageway back to the wellbore.

While the variation in the formation properties of the various producing intervals may lead to the need for a variety of viscosity levels in the fracturing fluids that may be utilized to perform the most effective fracturing treatment designs, they all have one thing in common. That being the effect that horizontal completions has had on treatment designs. The trend to horizontal completions has led to the increase of the "lateral" lengths and the number of fracturing stages that are required to maximize the amount of production that may be realized in a given well. As the number and size of the stages increases (regardless of the fluid being utilized) so does the requirement for water that is necessary to complete the fracture design. This trend may easily translate to a fracturing design for a well that could require 5 to 15 million gallons of water.

While slick water (containing friction reducers), linear gels and crosslinked gels all may be effective with fresh water and some limited blending of fresh and brackish water (containing an elevated level of total dissolved solids or TDS), no approach may retain their fluid viscosity (and related proppant transport capability) if TDS levels get too high or there is an attempt to utilize produced water, flow back water, or frac flow back water. This is because of high TDS of produced or flow back water which translates to a large number of water analytes or impurities compared to fresh water. While linear gels may maintain their viscosity and transport properties in high TDS fluids the same may not be said for the friction reducers that are a key part of a slick water design or a crosslinked polymer gel.

The effect that high TDS water has on the performance properties of the friction reducer (used in slick water designs) may be illustrated by the results of a dynamic proppant transport test. The procedure for such a test is shown below:

1. adding a 500 mL sample of a hydrated friction reducer/frac system to be tested to a blend jar including a blender and stir for 5 minutes to 1500 rpm (i.e., the time allowed for polymer hydration may be representative of an expected hydration period (associated with the treatment) or some standard period);
2. adding 120 g of a proppant to be tested (equivalent to 2 ppg) and mix for 30 seconds;
3. increasing a shear rate to achieve a calculated high shear history (i.e., the shear history may be specific to a particular application or some standard calculated shear history);
4. at the conclusion of the high shear history, reducing the blender rpm until build-up of proppant is visible on the bottom of the blend jar;
5. increasing the rpm to fluidize the settled proppant and then start decreasing rpm to again find a minimum rpm (i.e., for a friction reducer to exhibit an improved proppant transport the RPM reading needs to be a minimum of 10% lower than that of the same TDS water without a friction reducer) to prevent proppant build-up and repeating this process until the minimum rpm numbers remains within 10% of one another; and 6. recording a lowest rpm reading that does not cause proppant build up.

The adverse effect that high TDS waters have on the suspension properties of a friction reducer are illustrated in FIG. 1. The test results shown in FIG. 1 verify that an increase of TDS to 50,000 ppm will result in the total elimination of any (anionic or cationic) friction reducer's ability to improve proppant transport above the same TDS water without any polymer in solution.

Slick water fracturing designs are the most frequently utilized approach to fracture stimulating today's horizontal completion that continue to utilize massive amounts of fresh water. Their popularity is based on their relatively low cost coupled with their ability to create long, narrow fracture profiles. The desire to improve the well's response to this stimulation technique has resulted in an increase in the length of the lateral completion and in the number of stages performed in each treatment design. Both of these trends result in an increase in the amount of fresh water that is consumed in each stimulation operation.

There is increasing pressure to reduce the amount of fresh water that is consumed in the fracturing process. An obvious alternative would be to utilize high TDS water or at least a mixture of high TDS and fresh water as a replacement for fresh water in these fracturing operations. Unfortunately, the effect of elevated TDS on the viscosity and transport capability of a slick water fluid makes this approach less than desirable. The effect of high TDS on friction reducers is best shown in FIG. 1. The samples labeled AFRE-4 represent tests performed on a high molecular weight/high viscosity anionic friction reducer available from PfP Industries.

All test results depicted in FIG. 1 include a high shear period that represents the high velocity period corresponding to the fracturing fluid traveling through tubular good from the surface to the entry of the fracture. This representative shear history will test each friction reducer's capacity to resist shear degradation. The combination of high TDS and a representative shear history renders both the high viscosity anionic friction reducers and standard cationic friction reducers comparable (in suspension properties) to a high TDS water that does not contain a friction reducer/polymer to improve proppant transport.

A crosslinked fracturing fluid may be described as consisting of a hydratable polymer such as guar, its derivatives, or a natural polysaccharide that hydrates easily in water and may be cross-linked with metals or polyvalent compounds to form an efficient, effective, carrier of proppant into fractured formations. Traditionally, this type of fracturing fluid would include hydratable polymers such as guar, a pH buffer, and cross-linking compositions (such as a borate cross-linker). The traditional method for forming the fracturing fluid includes: (a) hydrating a hydratable polymer or hydratable polymer slurry in a pH neutral water, (b) adding a high pH buffer to the fluid to increase a pH of the fluid to a pH above pH 9, and (c) adding a cross-linking composition to the fluid to cross-link the hydratable polymers to form the viscosified fracturing fluid.

This type of fracturing fluid approach (unlike a slick water design) will possess a significant ability to generate fracture width and transport proppant if prepared using a relatively fresh water (low TDS) but if prepared using a high TDS water will result in a poor viscosity and minimum proppant transport capability as demonstrated by the data presented in FIG. 2.

FIG. 2 confirms the viscosity profile of a crosslinked polymer prepared with fresh water. Switching from fresh water to a higher TDS synthetic brine (in this case API brine which has approximately 110,000 ppm TDS) drops the viscosity by more than 50%. Even more interesting is that if you actually utilize a produced back water (instead of a synthetic brine with a similar TDS) the viscosity drops to approximately 5% of the value for the same system in fresh water.

The continued growth in horizontal completions and in the desire to increase the amount of proppant pumped into the fracture matrix will result an increased need of water to be used in the fracturing programs. This trend is already causing a concern in the amount of fresh water that is required to meet fracturing needs and that will only continue to grow. At some point it will become a necessity to fill some of the required volume with something other than fresh water. Produced water from the formation or produced back water (after a fracturing treatment) are something that currently requires a monitored disposal plan and process. Utilizing these water sources as part or all of the water (to be consumed in a fracturing treatment) will both decrease the fresh water requirement and offer an alternative to current disposal costs.

However, increasing the TDS of the water (to be utilized in a fracturing program) will create its own set of issues. In slick water design while increased TDS has minimal effect on the drag reduction (that may be achieved during a pumping operation), as shown in FIG. 1 it will also render both anionic and cationic friction reducers virtually incapable of significantly contributing to proppant transport. As shown in FIG. 2, high TDS will also impact the viscosity values that may be achieved and proppant transport capabilities that may be derived from crosslinked polymer systems.

Clearly there is a need to incorporate high TDS water in fracturing treatment designs that may replace either current crosslinked fluid systems (designed to transport and place high concentrations of proppant) or slick water systems that may still create the long relatively narrow propped fractures that are required to maximize well response in today's well. In the case of slick water systems, there is also a clear need to create a viable option to the high volume, high rate slick water treatment designs that result in a less than desirable propped fracture length.

SUMMARY OF THE DISCLOSURE

Embodiments of this disclosure provide fracturing fluid compositions including: (a) a base fluid, (b) a first buffer to adjust a pH of the base fluid to a target pH value, (c) a dry powdered hydratable polymer or a hydratable polymer slurry, (d) a cross-linking composition, and (e) an optional second buffer to increase the pH to a pH above pH 9 for cross-linking compositions that require a high final pH. The first buffer is adapted to lower the pH of the base fluid prior to adding the polymer or polymer slurry and the cross-linking composition to the base fluid, while the second buffer is adapted to raise the pH after the addition of the polymer or polymer slurry and the cross-linking composition to form a crosslinked or viscosified fracturing fluid.

In certain embodiments, the fracturing fluid compositions may not require addition of the second buffer as the fracturing fluid viscosifies at a final pH that is below a pH of 7.

In such compositions, there may not be a requirement to achieve a final pH adjustment (after the addition of the polymer or polymer slurry and the cross-linking composition). In other embodiments, the crosslinked compositions are based on reduced polymer concentration levels (generally<10 ppt) to achieve a controlled viscosity level that will be an efficient and effective alternative to a slickwater treatment design.

Embodiments of this disclosure provide systems for using fracturing fluids of this disclosure, where the systems include: (1) a vessel containing a fracturing fluid including: (a) a base fluid, (b) a first buffer to adjust a pH of the base fluid to a target pH value, (c) a dry powdered hydratable polymer or a hydratable polymer slurry, (d) a cross-linking composition, and (e) an optional second buffer to increase the pH to a pH above pH 9, wherein the pH is lowered to prior to adding the slurry and the cross-linking composition, and the pH is raised after the addition of the slurry and the cross-linking composition to form a viscosified fracturing fluid; and (2) an injection assembly for injecting the fracturing fluid from the vessel into a formation under fracturing conditions to fracture the formation. In other embodiments of this disclosure, the systems include: (1) a vessel containing a fracturing fluid including: (a) a base fluid, (b) a first buffer to adjust a pH of the base fluid to a target pH value, (c) a hydratable polymer slurry, (d) a cross-linking composition or mixtures that do not require the pH to be elevated by an additional or a second pH buffer and (2) an injection assembly for injecting the fracturing fluid from the vessel into a formation under fracturing conditions to fracture the formation. Embodiments are disclosed for formulating both high and low final pH crosslinkable polymer fracturing fluids, wherein the fluids have a greatly reduced polymer loading allowing a reduced targeted lower viscosity to be achieved.

In other embodiments, the systems are based on using a crosslinked fracturing fluid having a final pH that is less than or equal to pH 7. In such systems, the fracturing fluid may not require a final pH adjustment (after the addition of the slurry and crosslinker). In yet other embodiments, the systems are based on using a crosslinked fracturing fluid composition having a reduced polymer concentration level, generally, <10 ppt to achieve a controlled viscosity level that will be an efficient and effective alternative to a slickwater treatment design. In other embodiments, the fracturing fluid includes a proppant. In other embodiments, the systems include a fracture fluid vessel and a proppant containing fluid vessel and the injection assembly sequentially injects the proppant free fracturing fluid followed by the proppant containing fluid under fracturing conditions.

Embodiments of this disclosure provide methods for forming fracturing fluids based on an aqueous base fluid, where the methods include: (a) adding a first buffer to the aqueous base fluid to lower a pH of the base fluid to form a low pH base fluid, (b) adding a hydratable polymer or hydratable polymer slurry to the low pH base fluid to form a hydratable polymer fracturing fluid, (c) adding a cross-linking composition to the hydratable polymer fracturing fluid to form a pre-cross-linked fracturing fluid, and (d) optionally adding a second buffer to the pre-cross-linked fracturing fluid to increase a pH of the pre-cross-linked fracturing fluid to form a viscosified fracturing fluid. In certain embodiments, the methods also include the step of adding a proppant to the fracturing fluid. In other embodiments, the methods include fracturing a formation with a fracturing fluid of this disclosure, where the methods further includes injecting the fracturing fluid with the proppant or injecting a proppant free fracturing fluid followed by injecting a proppant fluid.

Embodiments of this disclosure provide methods for fracturing a formation using an aqueous high TDS base fluid, where the methods include forming a fracturing fluid including: (a) adding a first buffer to the aqueous high TDS base fluid to lower a pH of the aqueous high TDS base fluid to form a low pH aqueous high TDS base fluid, (b) adding a hydratable polymer or hydratable polymer slurry to the low pH aqueous high TDS base fluid to form a hydratable polymer fracturing fluid, (c) adding a cross-linking composition to the hydratable polymer fracturing fluid to form a pre-cross-linked fracturing fluid, and (d) optionally adding a second buffer to the pre-cross-linked fracturing fluid to increase a pH of the pre-cross-linked fracturing fluid to form a viscosified fracturing fluid. The methods also include injecting the fluid into a formation under fracturing conditions sufficient to fracture the formation. In certain embodiments, the methods also include the step of adding a proppant to the fracturing fluid prior to the injecting step. In other embodiments, the methods include injecting a proppant free fracturing fluid into the formation followed by injecting a proppant containing fluid into the formation under fracturing conditions.

BRIEF DESCRIPTION OF THE DRAWINGS OF THE DISCLOSURE

The disclosure may be better understood with reference to the following detailed description together with the appended illustrative drawings in which like elements are numbered the same:

Figure 4:
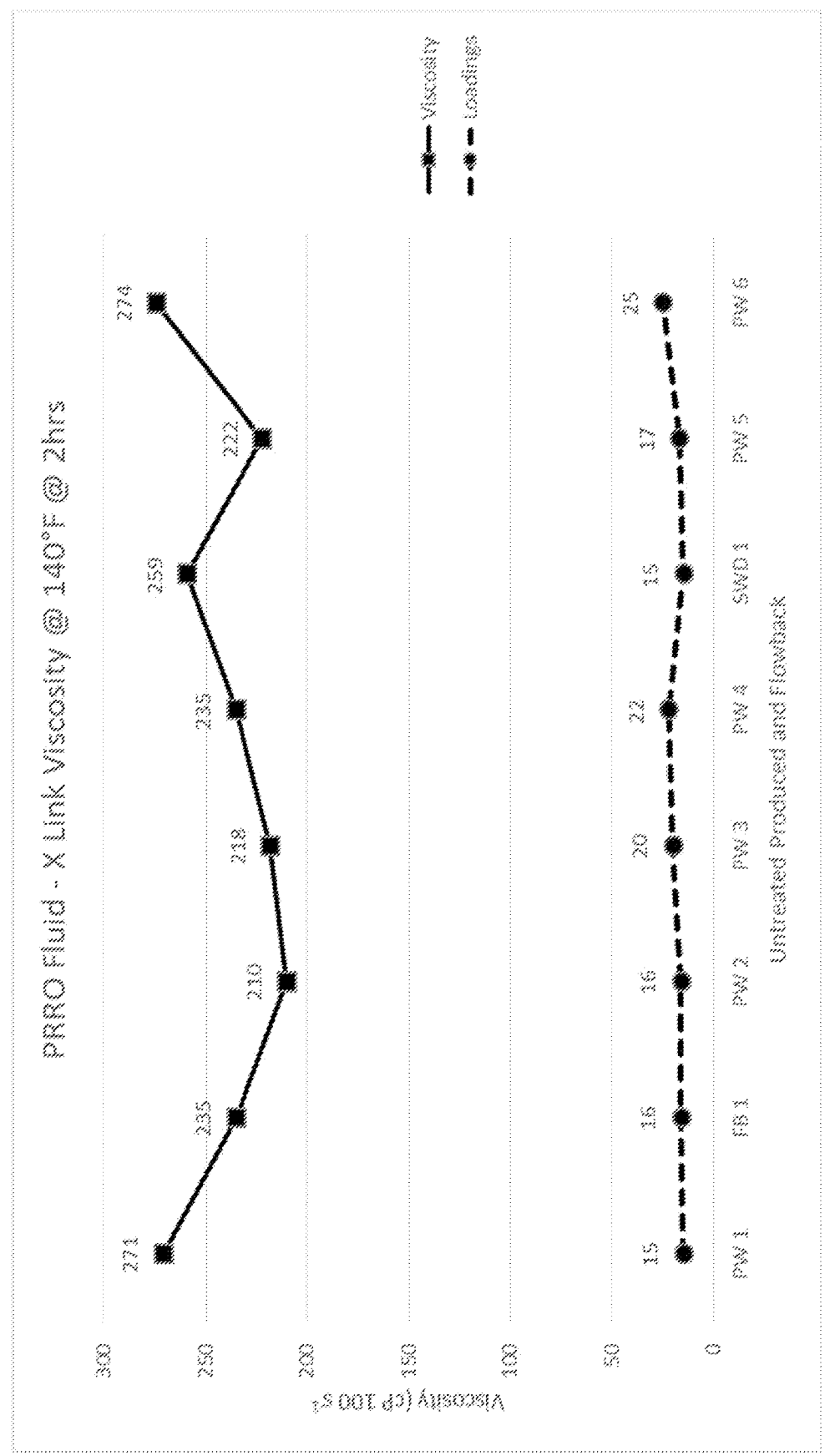

FIG. 4 depicts viscosities of a fracturing fluid of this disclosure using different waters, where PW1 is a first produced water, FB1 is a flowback water, PW2 is a second produced water, PW3 is a third produced water, PW4 is a fourth produced water, SWD1 is a disposal salt water, PW5 is a fifth produced water, and PW6 is a sixth produced water and where the loading is in gpt (gallons per thousand gallons).

Figure 5:
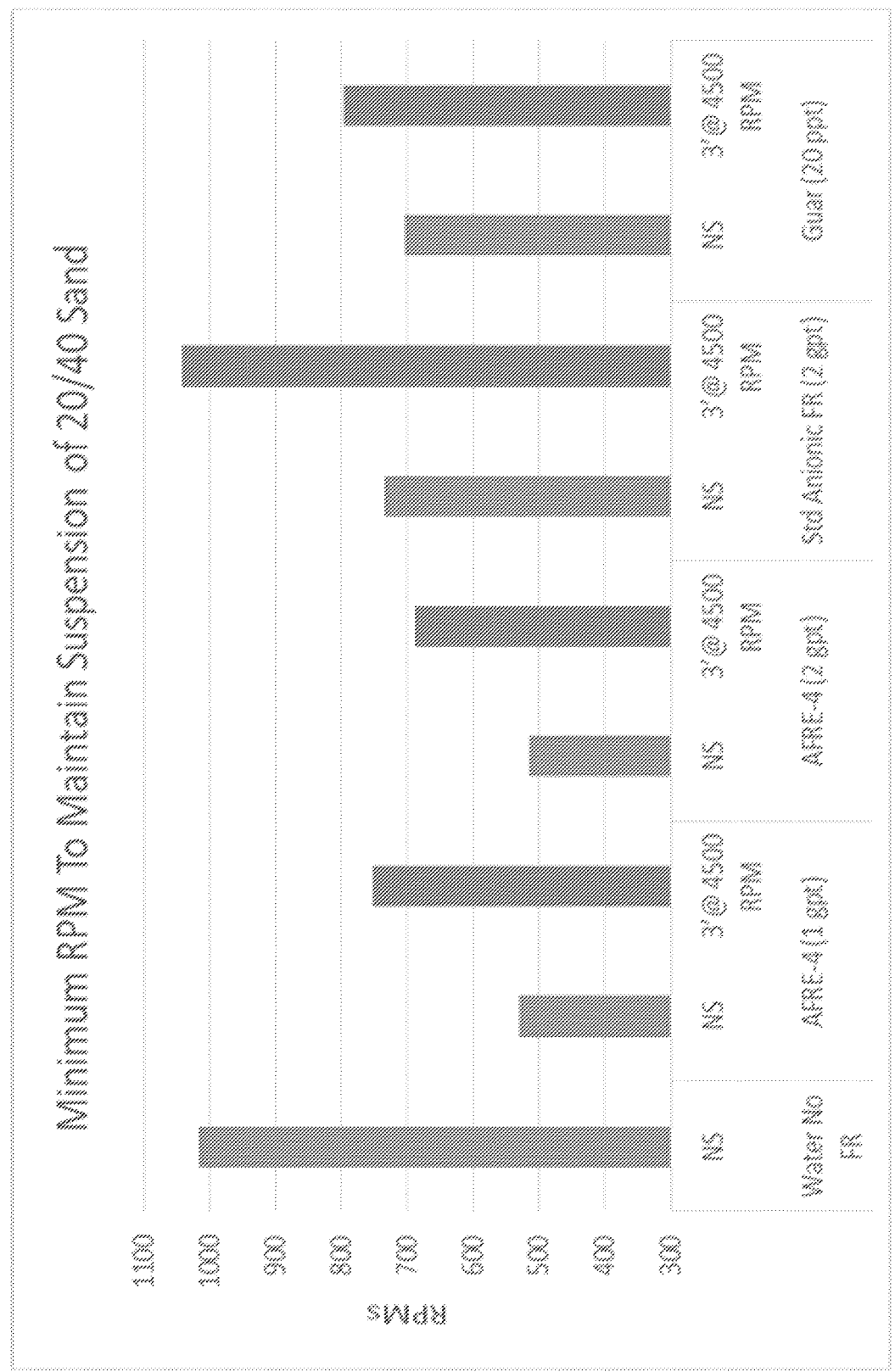

FIG. 5 depicts a plot of minimum rpm tests of fracturing fluids of this disclosure in high shear periods.

Figure 6:
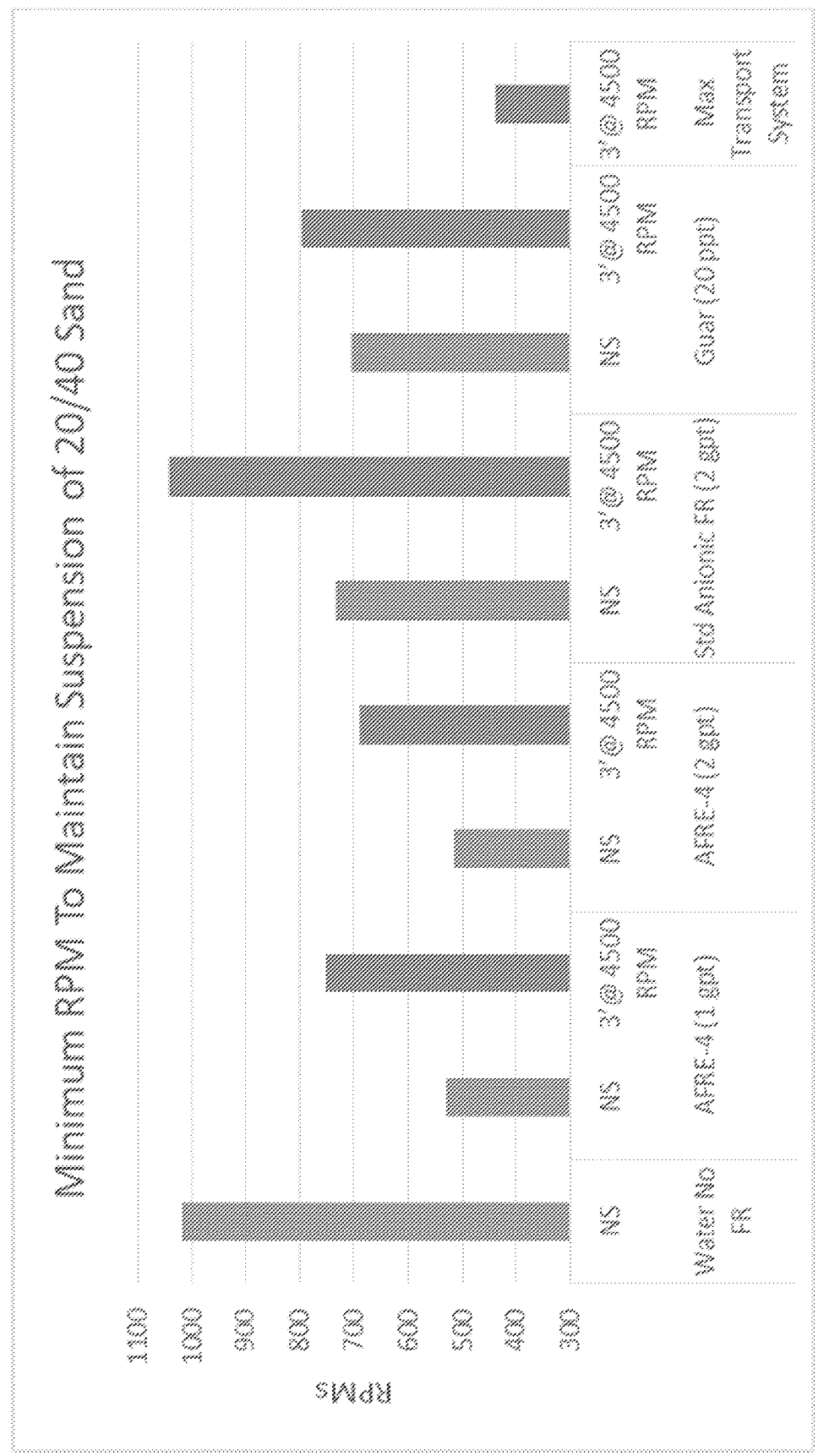

FIG. 6 depicts a plot of minimum rpm tests of fracturing fluids of this disclosure in high shear periods.

Figure 7:
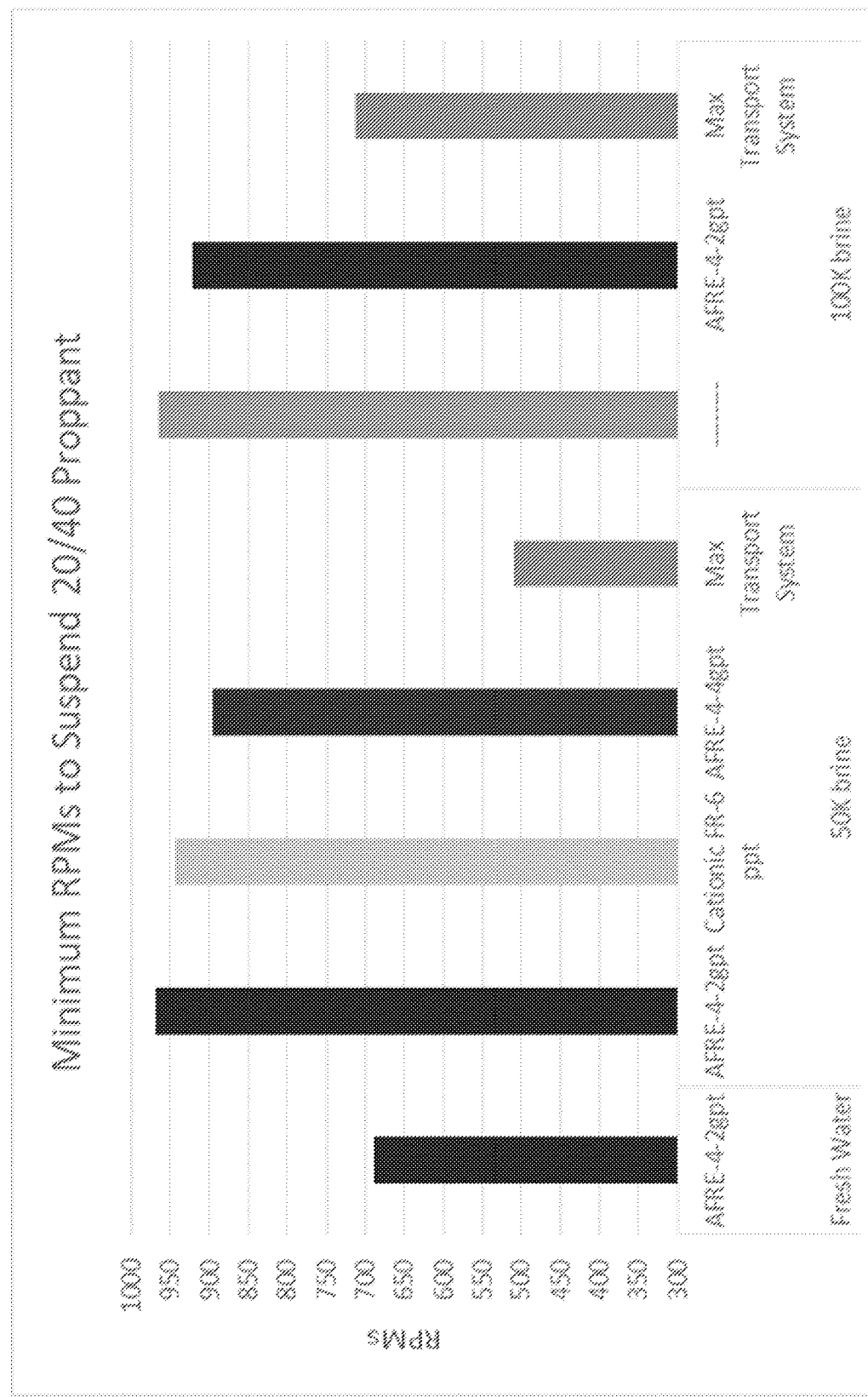

FIG. 7 depicts a plot of minimum rpm tests of fracturing fluids of this disclosure in high shear periods.

Figure 8:
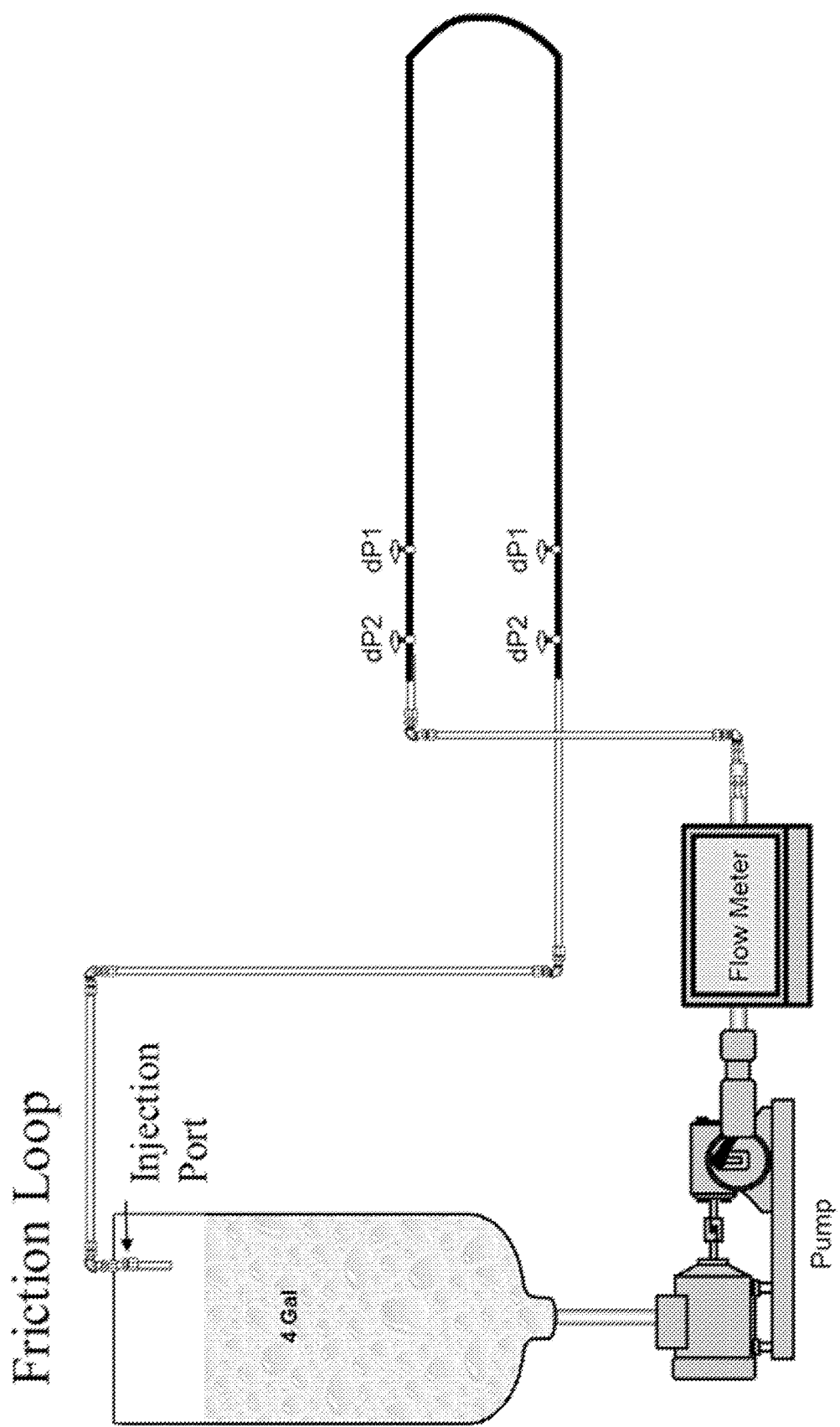

FIG. 8 depicts a testing system for testing the flow characteristics of the fluids.

Figure 9:
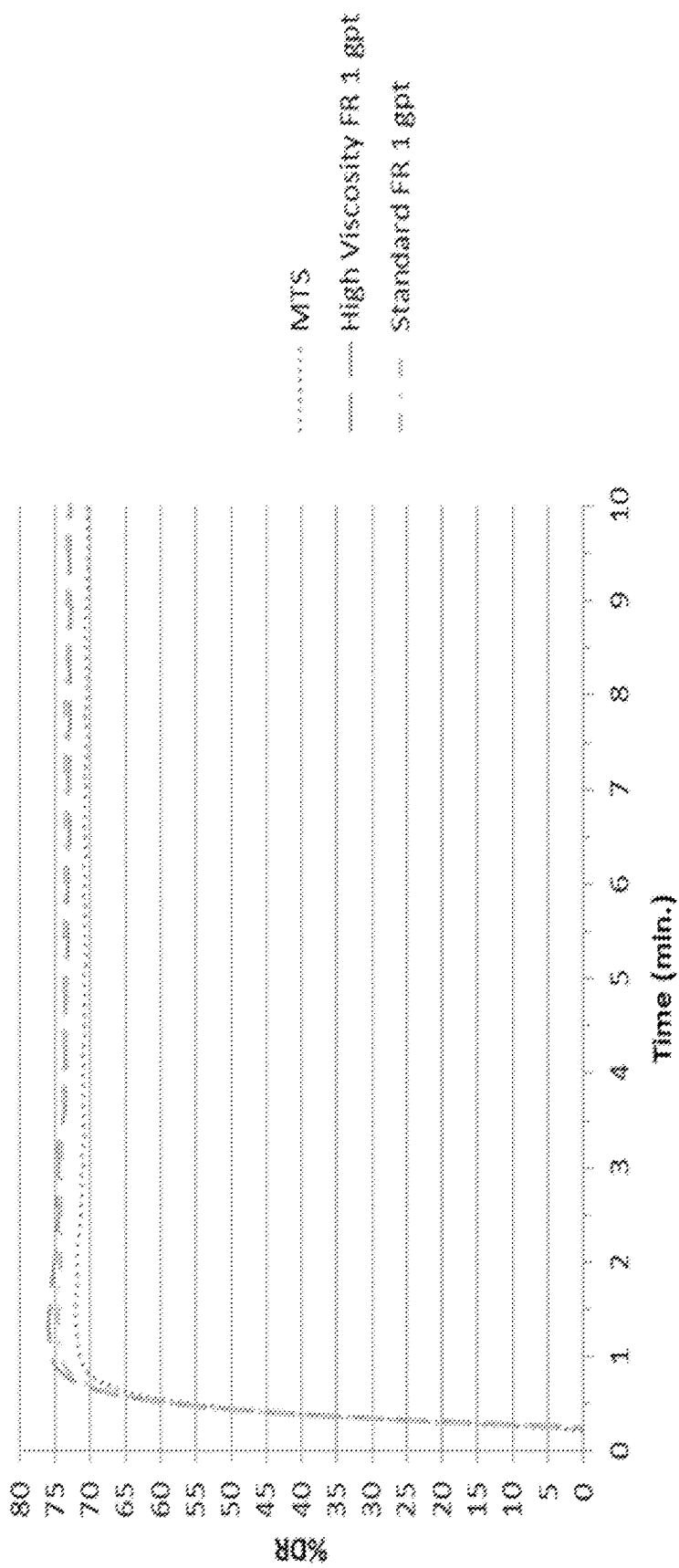

FIG. 9 depicts a comparison between the fracturing fluids of this disclosure and conventional fracturing fluids.

DEFINITIONS USED IN THE DISCLOSURE

In addition to having their customary and usual meaning, the following definitions apply where the context permits in the specification and claims:

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within±5% of the stated value. In other embodiments, the value is within ±2.5% of the stated value. In other embodiments, the value is within ±2% of the stated value. In other embodiments, the value is within ±1% of the stated value. In other embodiments, the value is within ±0.5% of the stated value. In other embodiments, the value is within ±0.1% of the stated value.

The term "gpt" means gallons per thousand gallons.
The term "gptg" means gallons per thousand gallons.
The term "pptg" or "ppt" means pounds per thousand gallons.
The term "wt. %" means weight percent.
The term "w/w" means weight per weight.
The term "ppm" means parts per million.
The term "cps" or "cP" means centipoise.
The term "rpm" means revolutions per minute.
The term "TDS" means total dissolved solids and means waters having from about 60 ppm to about 120,000 ppm total dissolved solids.
The term "RO" means reverse osmosis.
The term "FR" means friction reducer.

The term "fracturing" refers to the process and methods of breaking down a geological formation, i.e., the rock formation around a well bore, by pumping fluid at very high pressures, in order to increase production rates from a hydrocarbon reservoir. The fracturing methods of this disclosure use otherwise conventional techniques known in the art.

The term "under fracturing conditions" means injecting or pumping a fracturing fluid into a formation at a sufficient pressure, at a sufficient temperature (normally not an issue), and for a time sufficient to form fractures or fissures in the formation.

The term "proppant" refers to a granular substance suspended in the fracturing fluid during the fracturing operation, which serves to keep the formation from closing back down upon itself once the pressure is released. Proppants envisioned by the present disclosure include, but are not limited to, conventional proppants familiar to those skilled in the art such as sand, 20-40 mesh sand, resin-coated sand, sintered bauxite, glass beads, and similar materials.

DETAILED DESCRIPTION OF THE DISCLOSURE

The inventors have found that compositions, systems, and methods for forming and using fracturing fluids, where the fracturing fluids are based on aqueous base fluids including high TDS produced water and/or flow back water and/or disposal water and/or mixtures of fresh water. The compositions, systems, and methods may be formulated and implemented, where the compositions, systems, and methods are based on adjusting a pH of the aqueous base fluids to a sufficiently low pH to form a low pH base fluid, adding a hydratable polymer or hydratable polymer slurry to the base fluid to form a fracturing fluid, adding a cross-linking composition to the fracturing fluid to form a pre-cross-linked fracturing fluid, and then optionally (if utilizing a high pH crosslinking system) adjusting the pH of the pre-cross-linked fracturing fluid to a pH above pH 9 to from a crosslinked fracturing fluid. In certain embodiments, the methods also include adding a proppant to the crosslinked fracturing fluid. In other embodiment, the methods may also include adding a breaking composition to the fracturing fluids to break the viscosity of the fracturing fluids.

The compositions, systems, and methods of this disclosure are designed to overcome the problems associated with using high TDS (total dissolved solids) waters including produced and/or flow back water and/or disposal water in fracturing fluids, which will allow the use and reuse of treated and untreated produced water with or without the addition of fresh water. The inventors have found that, contrary to existing knowledge and practices, cross-linked hydratable polymer based fracturing fluids may be produced using produced, flow back, and/or fracturing flow back water or mixtures of these waters and fresh water. In certain embodiments, the hydratable polymers are guar and/or guar derivatives and the cross-linking composition comprises a borate cross-linkers or combinations of borate crosslinkers or crosslinkers that are compatible with low pH approaches to crosslinking. To that end, we re-engineered the cross-linking process and designed buffers to handle the severity of high TDS fluids such as produced and/or flow back water and/or disposal water. One such process includes the following steps: (a) adding a first buffer to an aqueous base fluid including a high TDS water to lower a pH of the aqueous base fluid to form a low pH base fluid; (b) adding a hydratable polymer or hydratable polymer slurry to the base fluid to form a fracturing fluid; (c) adding a cross-linking composition to the fracturing fluid to form a pre-cross-linked fracturing fluid; and optionally (if the cross-linked system being utilized requires high pH) (d) adding a second buffer to increase the pH of the pre-cross-linked fracturing fluid to form a crosslinked fracturing fluid.

In certain embodiments, the first buffer is added to the base fluid at a level sufficient to adjust a pH of the base fluid to an acidic pH. In certain embodiments, the acidic pH is less than or equal to pH 7. In other embodiments, the acidic pH is less than or equal to pH 6. In other embodiments, the acidic pH is less than or equal to pH 5. In other embodiments, the acidic pH is less than or equal to pH 4. The buffer may include an inorganic acid, an organic acid, or mixtures thereof. The first buffer is added until the pH is at an acidic level for example at or below pH 7, 6, 5, or 4. In certain embodiments, an amount of the added first buffer is between about 0.1 gpt and about 5 gpt depending on the initial pH of the base fluid.

In certain embodiments where a high pH is needed, a second buffer is added to the fracturing fluid after the polymer or the polymer slurry and the crosslinking composition have been added at a level sufficient to adjust a pH of the fracturing fluid to at or below pH 9. The second buffer may include an inorganic base, an organic base, or mixtures thereof. The second buffer is added until the pH is at or below pH 9. In certain embodiments, an amount of the added second buffer is between about 0.1 gpt and about 5 gpt depending on the initial pH of the fracturing fluid. As the pH of the fracturing fluid prior to addition of the second buffer is considerably below pH 9, cross-linking of the fracturing fluid does not start to occur until the pH of the fluid approaches pH 9 or greater. Thus, the compositions have a build in cross-link delay system, which is one of the unique features of the compositions, systems, and/or methods of this disclosure.

The compositions, systems and methods also provide systems that incorporate a crosslinked polymer approach based on a final pH that is below pH 7. In such systems, it may not be necessary to make a final pH adjustment (after the addition of the polymer or the polymer slurry and the crosslinking composition). Still other compositions, systems and methods will provide approaches in which the cross-linked compositions are based on reduced polymer concentration levels of <10 ppt to achieve a controlled viscosity that will result in the generation of the desired long narrow type fractures, but with superior proppant transport as compared to low viscosity slick water designs and therefore increased propped fracture length.

Embodiments of the present disclosure broadly relates to fracturing fluid compositions including: (a) a base fluid comprising an elevated total dissolved solids (TDS) water selected from the group consisting to produced, flow back water, brackish water, reverse osmosis (RO) reject water, clear brine, and mixtures and combinations thereof, (b) a first buffer, (c) a hydratable polymer or a hydratable polymer slurry, and (d) a cross-linking composition, wherein the first buffer is adapted to adjust a pH of the base fluid to an acidic pH prior to adding the hydratable polymer or the hydratable polymer slurry and the cross-linking composition to the base fluid to reduce or prevent pre-mature polymer crosslinking, and wherein the cross-linking composition crosslinks the hydratable polymer after hydration to form the fracturing fluid composition having a crosslinked structure. In certain embodiments, the compositions may also include (e) a second buffer to adjust the pH to a final pH sufficient to activate the crosslinking composition toe form the cross-linked structure in the composition. In other embodiments, the second buffer adjusts the pH to at or above 9. In other embodiments, the base fluid further includes fresh water. In other embodiments, the the hydratable polymer is selected from the group consisting of galactomannan gums, glucomannan gums, guars, derivatized guars, cellulose derivatives, synthetic polymers such as polyvinyl alcohol, polyacrylamides, poly-2-amino-2-methyl propane sulfonic acid, other synthetic polymers and copolymers, and mixtures or combinations thereof. In other embodiments, the the hydratable polymer is a guar or derivatized guar and is in powder form when added to the composition or to the slurry. In other embodiments, the hydratable polymer is a mixture of a guar or derivatized guar and a polyacrylamide in which the polyacrylamide is present in an amount between 5 wt. % and 20 wt. % of the total polymer weight, and the polyacrylamide reduces a drag of the composition being pumped through a tubular downhole injection mechanism into a formation to be fracture and improves a shear stability of the crosslinked structure formed in the composition. In other embodiments, the the hydratable polymer is present in an amount between about 0.05 wt. % and about 0.5 wt. % in the composition or if in a slurry form, the polymer is present in an amount between about 1 gpt and about 10 gpt in the slurry. In other embodiments, the the amount is between about 0.05 wt. % and about 0.10 wt. % in the composition or between about 1 gpt and 2 gpt in the slurry. In other embodiments, the the acidic pH is less than or equal to pH 7, or less than or equal to pH 6, or less than or equal to pH 5, or less than or equal to pH 4. In other embodiments, the crosslinking composition is capable of producing the crosslinked structure at the acidic pH. In other embodiments, the crosslinking composition comprises compounds including boron ions, zirconium ions, and titanium ions, or mixtures thereof. In other embodiments, the crosslinking composition comprises one or more borate compounds.

Embodiments of the present disclosure broadly relates to methods of fracturing a subterranean formation including pumping a fracturing fluid compositions including (a) a base fluid comprising an elevated total dissolved solids (TDS) water selected from the group consisting to produced, flow back water, brackish water, reverse osmosis (RO) reject water, clear brine, and mixtures and combinations thereof, (b) a first buffer, (c) a hydratable polymer or a hydratable polymer slurry, and (d) a cross-linking composition, wherein the first buffer is adapted to adjust a pH of the base fluid to an acidic pH prior to adding the hydratable polymer or the hydratable polymer slurry and the cross-linking composition so that the polymer may hydrate but not crosslink, and wherein the cross-linking composition crosslinks the hydratable polymer to form the fracturing fluid composition having a crosslinked structure. In certain embodiments, the composition used in the methods may also include a second buffer to adjust the pH to a final pH sufficient to activate the crosslinking composition. In other embodiments, the second buffer adjusts the pH to at or above 9. In other embodiments, the base fluid further includes fresh water. In other embodiments, the methods may further include adding a proppant to the fracturing fluid being pumped into the well. In other embodiments, the hydratable polymer can be taken from a group that includes galactomannan gums, glucomannan gums, guars, derivatized guars, cellulose derivatives, synthetic polymers such as polyvinyl alcohol, polyacrylamides, poly-2-amino-2-methyl propane sulfonic acid, and various other synthetic polymers and copolymers and mixtures or combinations thereof. In other embodiments, the hydratable polymer is a guar or derivatized guar and is in powder form when added to the composition or to the slurry. In other embodiments, the hydratable polymer is a mixture of a guar or derivatized guar and a polyacrylamide in which the polyacrylamide is present in an amount between 5 wt. % and 20 wt. % of the total polymer weight, and the polyacrylamide reduces a drag of the composition being pumped through a tubular downhole injection mechanism into a formation to be fracture and improves a shear stability of the crosslinked structure formed in the composition In other embodiments, the hydratable polymer is present in an amount between about 0.05 wt. % and about 0.5 wt. % in the composition or if in a slurry form, the polymer is present in an amount between about 1 gpt and about 10 gpt in the slurry. In other embodiments, the amount is between about 0.05 wt. % and about 0.10 wt. % in the composition or between about 1 gpt and 2 gpt in the slurry. In other embodiments, the acidic pH is less than or equal to pH 7, or less than or equal to pH 6, or less than or equal to pH 5, or less than or equal to pH 4. In other embodiments, the crosslinking composition is capable of producing the crosslinked structure at the acidic pH. In other embodiments, the crosslinking composition is comprised of metal ions including boron, zirconium, and titanium containing compounds, or mixtures thereof. In other embodiments, the crosslinking composition comprises one or more borate compounds.

Suitable Reagents Used in the Disclosure

Aqueous Base Fluids

Suitable aqueous base fluids include, without limitation, a high TDS produced water, a high TDS flow back water, a high TDS fracturing flow back water, a brackish water, a reverse osmosis (RO) reject water, a clear brine, and mixtures thereof. In certain embodiments, the aqueous base fluids further include fresh water.

Hydratable Polymers

Suitable hydratable polymers or gelling agents that may be used in the disclosure include, without limitation, any hydratable polysaccharides that are capable of forming a gel in the presence of a crosslinking agent. Exemplary examples of hydratable polysaccharides include, without limitation, galactomannan gums, glucomannan gums, guars, derivatized guars, cellulose derivatives, and mixtures or combinations thereof. Specific examples are guar gum, guar gum derivatives, locust bean gum, Karaya gum, carboxymethyl cellulose, carboxymethyl hydroxyethyl cellulose, and hydroxyethyl cellulose. Other specific examples include, without limitation, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. In certain embodiments, the molecular weight of the hydratable synthetic polymers are between about 10,000 to about 100,000,000. In other embodiments, the molecular weight is between about 10,000 to about 10,000,000. In other embodiments, the molecular weight is between about 10,000 to about 1,000,000.

The hydratable polymer may be present in a fracturing fluid in concentrations ranging from about 0.05 wt. % to about 10 wt. %. In certain embodiments, the polymer concentration ranges between about 0.10 wt. % and about 5.0 wt. %. In other embodiments, the polymer concentration ranges between about 0.05 w. % and about 0.7 wt. % of the aqueous fluid. In certain embodiments, the hydratable polymer is present in a range from about 0.10 wt. % to about 0.25 wt1.%. If the polymer is in the form or a slurry, then the slurry is present in an amount between about 10 gpt and about 30 gpt (gallons per thousand gallons) of the fracturing fluid. In certain embodiments, the polymer slurry amount is between about 1 gpt and about 15 gpt. In other embodiments, the polymer slurry amount is between about between about 2 gpt and about 5 gpt.

Crosslinking Agents

Suitable crosslinking agents include, without limitation, any compound that increases the viscosity of a fluid including the hydratable polymers by chemical crosslinks, physical crosslinks, and/or cross-links the hydratable polymer by any other mechanism. For example, the gelation of a hydratable polymer may be achieved by cross-linking the polymer with metal ions including boron, zirconium, and titanium containing compounds, or mixtures thereof. One class of suitable crosslinking agents is organotitanates. Another class of suitable crosslinking agents is borates. The selection of an appropriate crosslinking agent depends upon the type of treatment to be performed and the hydratable polymer to be used. The amount of the crosslinking agent used also depends upon the well conditions and the type of treatment to be introduced. However, the range is generally from about 10 ppm to about 1000 ppm of metal ion of the crosslinking agent in the hydratable polymer fluid.

Other crosslinking agents may be a borate-containing compounds, titanate-containing compounds, zirconium-containing compound, and mixtures thereof. For example, the crosslinking agent can be sodium borate×$H_2O$ (varying waters of hydration), boric acid, borate crosslinkers (a mixture of a titanate constituent, preferably an organotitanate constituent, with a boron constituent. The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base. The boron constituent can be selected from the group consisting of boric acid, sodium tetraborate, and mixtures thereof. These are described in U.S. Pat. No. 4,514,309, incorporated herein by reference, borate based ores such as ulexite and colemanite, Ti(IV) acetylacetonate, Ti(IV) triethanolamine, Zr lactate, Zr triethanolamine, Zr lactate-triethanolamine, Zr lactate-triethanolamine-triisopropanolamine, or mixtures thereof. In some embodiments, the well treatment fluid composition may further comprise a proppant.

Yet other crosslinking agents that crosslink polymer to even higher viscosities and more effective at carrying proppant into the fractured formation. The borate ion has been used extensively as a crosslinking agent, typically in high pH fluids, for guar, guar derivatives and other galactomannans. See, for example, U.S. Pat. No. 3,059,909, incorporated herein by reference and numerous other patents that describe this classic aqueous gel as a fracture fluid. Other crosslinking agents include, for example, titanium crosslinkers (U.S. Pat. No. 3,888,312, incorporated herein by reference), chromium, iron, aluminum, and zirconium (U.S. Pat. No. 3,301,723, incorporated herein by reference). Of these, the titanium and zirconium crosslinking agents are typically preferred. Examples of commonly used zirconium crosslinking agents include zirconium triethanolamine complexes, zirconium acetylacetonate, zirconium lactate, zirconium carbonate, and chelants of organic alphahydroxycorboxylic acid and zirconium. Examples of commonly used titanium crosslinking agents include titanium triethanolamine complexes, titanium acetylacetonate, titanium lactate, and chelants of organic alphahydroxycorboxylic acid and titanium. The crosslinking compositions may include mixtures or combination of any of crosslinking agents disclosed herein.

Proppants

Suitable propping agents or proppants are typically added to the fracturing fluid prior to the addition of a crosslinking agent. However, proppants may be introduced in any manner which achieves the desired result. Any proppant may be used in embodiments of the disclosure. Examples of suitable proppants include, but are not limited to, quartz sand grains, glass and ceramic beads, walnut shell fragments, aluminum pellets, nylon pellets, and the like. Proppants are typically used in concentrations between about 1 lb to about 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

Breaking Agents

The term "breaking agent" or "breaker" refers to any chemical that is capable of reducing the viscosity of a gelled or crosslinked fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow through the proppant packed fracture into the well bore. This reduction in viscosity of the treating fluid is commonly referred to as "breaking" The reduction in viscosity may be attributable to breaking the crosslinked structure, degrading the base polymer being used or a combination of both mechanisms. Consequently, the chemicals used to break the viscosity of the fluid is referred to as a breaking agent or a breaker.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812, incorporated herein by reference. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566, incorporated herein by reference.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219, incorporated herein by reference.

Inorganic Acids

Suitable inorganic acids include, without limitation, any inorganic acid. Exemplary examples include, without limitation, hydrogen chloride, sulfuric acid, phosphoric acid, or mixtures thereof.

Organic Acids

Suitable organic acids include, without limitation, any organic acid. Exemplary examples include, without limitation, formic acid, acetic acid, propionic acid, or mixtures thereof Inorganic Bases Suitable inorganic bases include, without limitation, any inorganic base. Exemplary examples include, without limitation, sodium hydroxide, sodium bicarbonate, sodium carbonate, sodium bicarbonate, potassium hydroxide, potassium bicarbonate, potassium carbonate, or mixtures thereof.

Organic Bases

Suitable organic acids include, without limitation, any organic base. Exemplary examples include, without limitation, sodium tert-butoxide, potassium tert-butoxide, choline hydroxide, or mixtures thereof.

Friction Reducing Agents

Suitable friction reducing agents include, without limitation, high molecular weight, anionic polymers having a molecular weight of above about 15 million, or ranging from about 18 million to about 40 million or ranging from about 18 million to about 25 million. Most standard polymers useful as friction reducers for oil and gas field stimulation exhibit a molecular weight within the range of about 10 to about 12 million. Exemplary example of high molecular weight, anionic polymers include, without limitation, hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers including acrylic acid, methyacrylic acid, and/or acrylamide with other ethylenically unsaturated monomers including vinyl alcohol, ethylene, propylene, etc. and mixtures and combinations thereof. In certain embodiments, the friction reducing agents include partially hydrolyzed polyacylamide (PHPA).

Nonionic and Amphoteric Polymers

Suitable nonionic and amphoteric polymers used in the present composition preferably exhibit a molecular weight within the range of about 8 million to about 14 million or ranging from about 10 million to 15 million or ranging from about 10 million to about 12 million. Additional information on this mixture of friction-reducing polymers for high TDS systems is disclosed in copending U.S. patent application Ser. No. 15/786,769 the disclosure of which is hereby incorporated by reference.

Exemplary polymers (anionic, cationic, or amphoteric) may also be homopolymers, copolymers, terpolymers, or high order mixed monomer polymers synthesized from one or more anionic monomers, cationic monomers, and/or neutral monomers. For copolymer and high order mixed monomer polymers, the monomers used may have similar reactivities so that the resultant amphoteric polymeric material has a random distribution of monomers. The anionic monomers may be any anionic monomer such as acrylic acid, methacrylic acid, 2-acrylamide-2-methylpropane sulfonic acid, and/or maleic anhydride. The cationic monomer may be any cationic monomer such as dimethyl-diallyl ammonium chloride, dimethylamino-ethyl methacrylate, and/or allyltrimethyl ammonium chloride. The neutral monomer may be any neutral monomer such as butadiene, N-vinyl-2-pyrrolidone, methyl vinyl ether, methyl acrylate, maleic anhydride, styrene, vinyl acetate, acrylamide, methyl methacrylate, and/or acrylonitrile. Other exemplary polymers may be a terpolymer synthesized from acrylic acid (AA), dimethyl diallyl ammonium chloride (DMDAC) or diallyl dimethyl ammonium chloride (DADMAC), and acrylamide (AM). The ratio of monomers in the terpolymer can generally be any ratio. A presently preferred ratio is about 1:1:1. Other exemplary amphoteric polymeric materials include approximately 30% polymerized AA, 40% polymerized AM, and 10% polymerized DMDAC or DADMAC with approximately 20% free residual DMDAC or DADMAC which is not polymerized due to lower relative reactivity of the DMDAC or DADMAC monomer.

EXPERIMENTS OF THE DISCLOSURE

Example 1—Crosslinked Fracturing Fluid Made with Produced Water

This example compared the rheologies of three different crosslinked fracturing fluid systems: a standard borate crosslinked fresh water fracturing fluid, a produced water sample including no pH adjusting buffer, and a produced water sample including a pH adjusting buffer. The rheologies are shown in FIG. 3.

Figure 1:
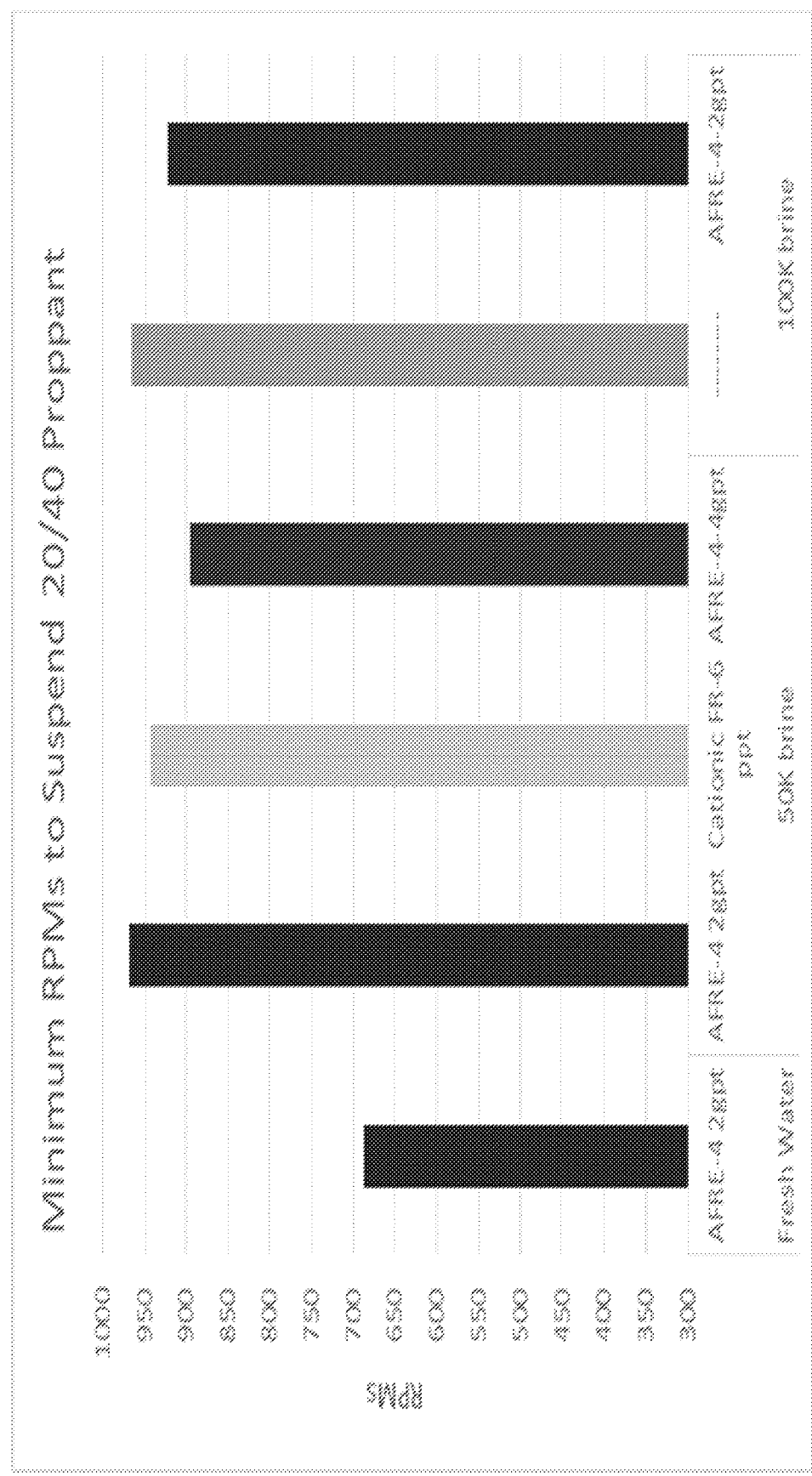
FIG. 1 depicts a plot of minimum rpm tests of fracturing fluids based on different base fluids in high shear periods.
Figure 2:
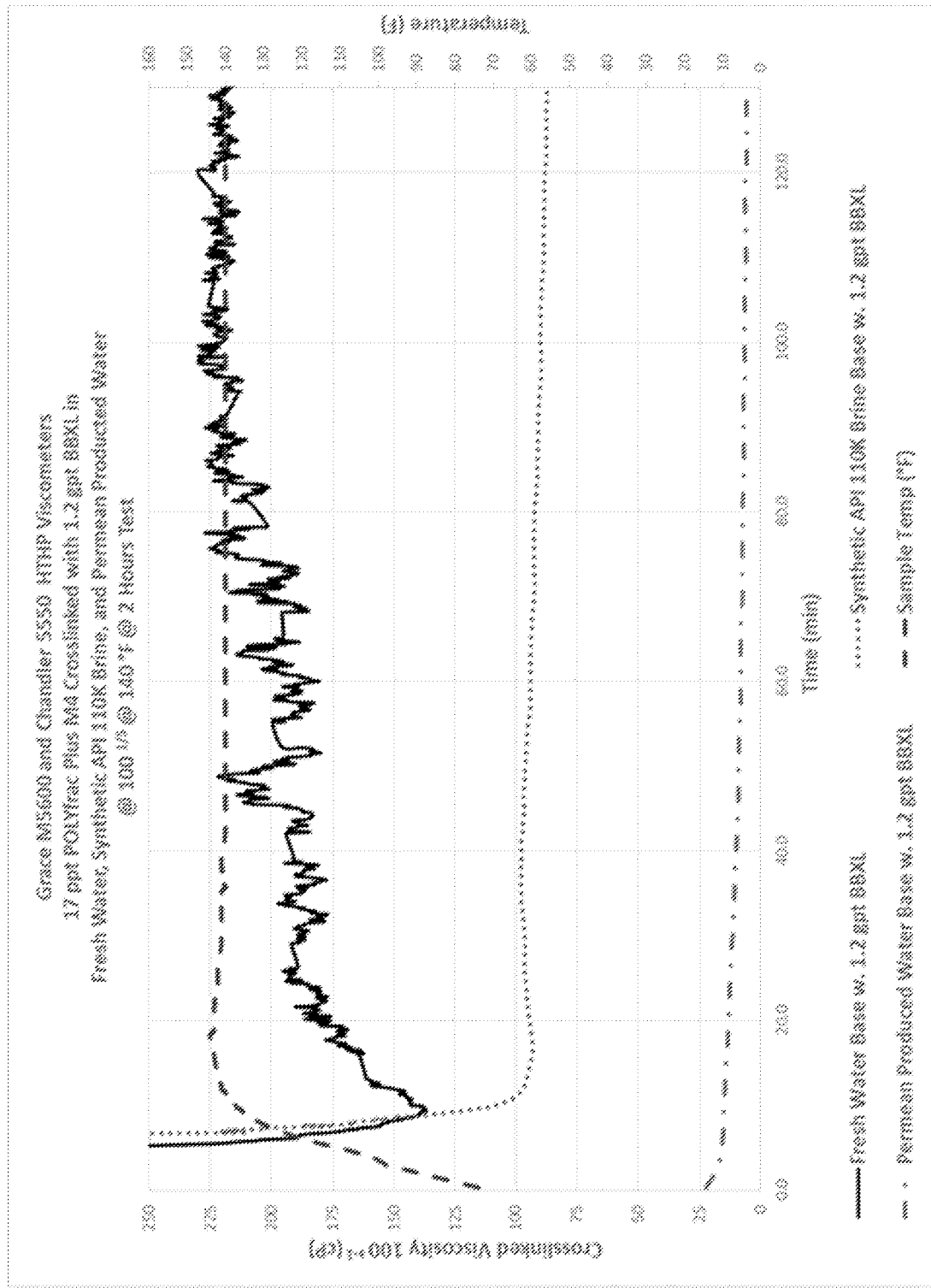
FIG. 2 depicts the viscosity profiles of a crosslinked fluids based on different base fluids.
Figure 3:
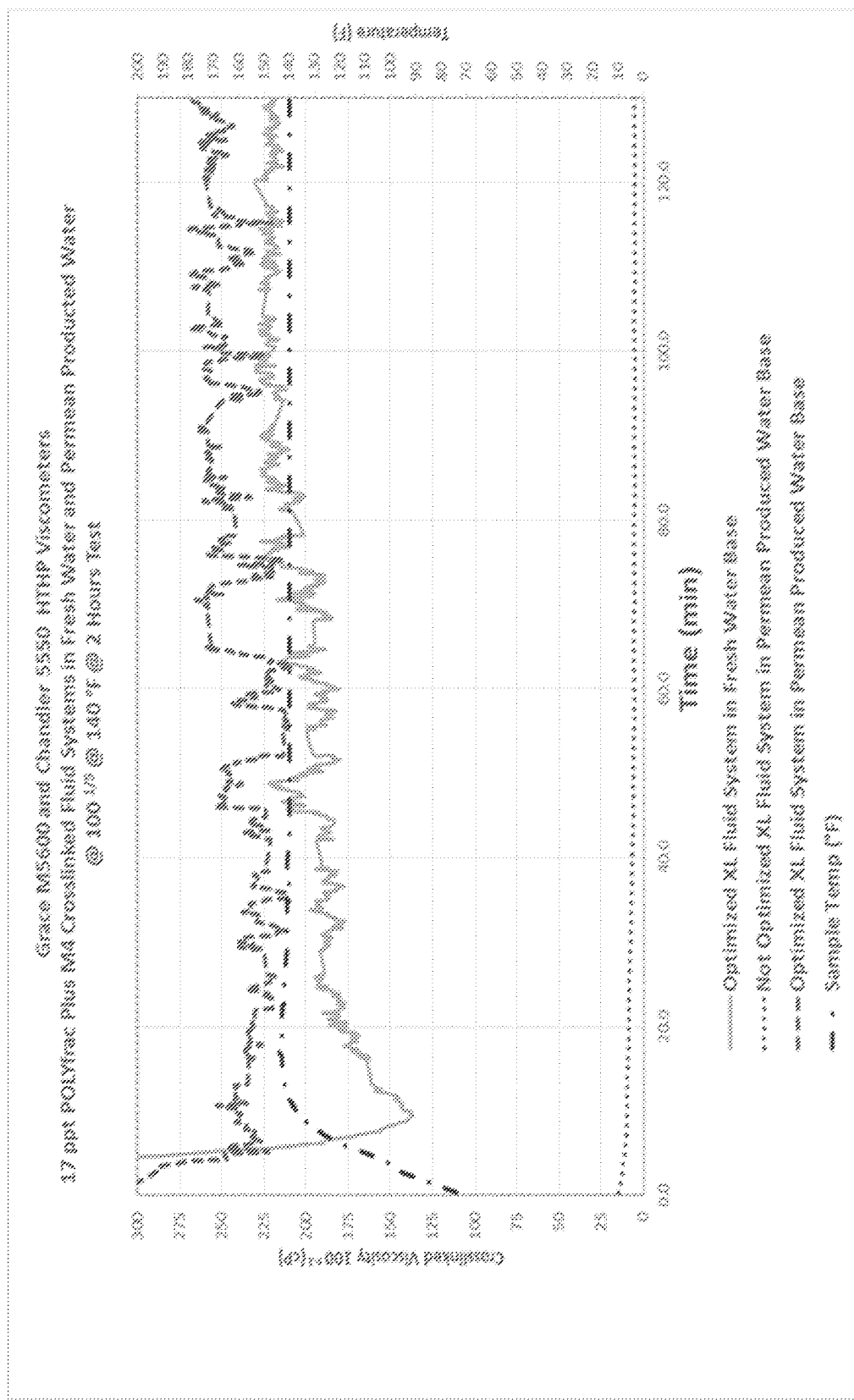
FIG. 3 depicts the behavior of a fracturing fluid of this disclosure.

A standard borate crosslinked fracturing fluid (made in a fresh water) was prepared using the following:
a) a guar gum loading of 17 ppt
b) a pH buffer to adjust the fluid pH to above 9
c) a borate crosslinking solution This combination of chemicals produced the rheology properties represented by the grey curve in FIG. 3. This curve shows a fracturing fluid system that may sustain a viscosity of ≥200 cps @ 100 $sec^{-1}$ for over two hours.

This test was then rerun after replacing the fresh water with a high TDS produced back water sample. The produced back water had an analysis as follows:

| Property/Reagent | Concentrations (mg/L) |
|---|---|
| pH | 7.05 |
| TDS | 99000 |
| Total Hardness as $CaCO_3$ | 6200 |
| Carbonate | 0 |
| Bicarbonate | ≥2440 |
| Alkalinity | ≥2440 |
| Chloride | 60000 |
| $H_2S$ | 1 |
| Bacteria | |
| SRB (cell/mL) | 1000 |
| APB (cell/mL) | 1000 |
| Calcium (Titration) | 2240 |
| Magnesium (Titration) | 145.8 |
| Boron (Hach) | 43 |

Utilizing the same three components (from the fresh water test) and a produced back fluid resulted in the rheology properties represented by the dotted curve in FIG. 3. The results of this test confirm that the use of a produced water prevents the development of any significant viscosity.

Finally, the effectiveness of utilizing the compositions, systems and methods may be illustrated by using the same high TDS produced water in the following modified procedure:

1. Weigh 350 (±0.5) grams of produced water base fluid into 1 liter blender glass jar.
2. Mix produced water base fluid on Constant Speed Blender at 2000 (±100) rpm.
3. Add 1.25 gpt of a low pH buffer or adjust produced water base fluid to pH~4.5.
4. Measure 17 ppt POLYfrac Plus M4, a slurry of a guar gum in a suspension package, (~1.5 mL of slurry) in 3 mL syringe.
5. Inject 1.5 mL slurry into blender jar and mix for 3 minutes.
6. Measure and record viscosity on Fann 35 viscometer (w. R1B1) or equivalent @ 300 rpm (511 sec$^{-1}$) for 1 minute and record pH.
7. Weigh 100 (±0.5) grams of linear gel into Pyrex 300 mL glass beaker or equivalent.
8. Place beaker under overhead mixer and mix gel at 1000 (±50) rpm with high efficiency mixing blade.
9. Add 1.8 gpt BBXL, a borate based crosslinker, (0.18 mL) and promptly add 1.4 gpt Catalyst Activator, a pH buffer that is used to adjust the final pH of the fracturing fluid, (0.14 mL) into the gel solution.
11. Mix gel until crosslinking
12. Promptly weigh 50 (±0.5) grams of crosslinked gel into cup and place it on Grace M5600 HTHP viscometer or equivalent.
13. Run test at 140° F. for 2 hours.
14. Record crosslinked gel pH and post crosslinked gel pH.

The dashed curve in FIG. 3 illustrates the test results from the compositions, systems and methods of this disclosure. The test results verify the ability to reach a high viscosity that is stable at 250 cps @ for at least 2 hours that is comparable if not superior to the fresh water test results.

Example 2—Composition and System Behavior

A variety of compositions of this disclosure was tested. The same approach utilized in Example 1 was repeated for each composition to illustrate the effectiveness of this approach. The results of these tests are illustrated in FIG. 4.

The graph illustrates the results of utilizing the previously described compositions of the disclosure to generate a two hour viscosity that is comparable to what is achieved when using a fresh water. The eight produced water sources covered a TDS range from about 60 ppm to about 120,000 ppm. But even more important than the TDS was the presence of measurable amounts of ions (for example boron) that have historically been known to present major issues in creating a crosslinked fracturing fluid that exhibits the targeted viscosity and temperature stability that is required when utilizing this type of fracturing fluid system.

Example 3—Shear History Effects

To measure proppant suspension properties of a polymer containing fracturing fluid (both before and after a shear history) in a dynamic test, the following procedure was developed:
a) hydrate the polymer (to be evaluated) for 5 minutes at 1500 rpm.
b) add 120 gm of 20/40 coated or uncoated sand (2 pounds per gallon) and mix for 60 seconds at 1500 rpm. Note that the 120 grams would equate to 2 lb/gal if the test sample size is 500 mL.
c) lower the rpm until sand accumulates on the bottom of the blender jar.
d) record the lowest rpm reading that does not cause sand accumulation.

To establish the shear sensitivity of the test sample, the above sequence was repeated by adding a high shear step (3 minutes @ 4500 rpm) between steps (b) and (c).

Using the above procedure (both with and without a shear step) with uncoated sand yielded the data shown in FIG. 5. The reported minimum rpm reflects the degree of dynamic movement necessary to keep the solids in suspension. The proppant is 20/40 uncoated sand.

These test results showed that a shear history resulted in a greater than 40% increase in measured minimum rpm (which equates to a >40% decrease in transport properties). Both standard and high molecular weight/viscosity friction reducers showed a level of shear degradation. However, when the standard friction reducers were exposed to a representative shear history, the result was a complete loss of proppant transport properties (sheared standard friction reducers gave similar suspension results to the base fluid without the addition of a polymer). The high molecular weight/viscosity friction reducer was damaged by a representative shear history, but still retained some measureable ability to contribute to proppant transport. A linear gel was shown to not be so shear degradable, but also was less effective (than the high viscosity friction reducer) in contributing to proppant transport.

Example 4—Shear History and Controlled Crosslinking

One option to low viscosity, high rate slick water treatment is to utilize the compositions, systems and methods of this disclosure to create a low polymer concentration crosslinked fracturing fluid that will exhibit a controlled viscosity increase and improved proppant transport. This approach may be designed to accomplish the following:
a) generate relatively long narrow fractures or fracture geometries, b) improve proppant transport, which in turn leads to an increase in propped fracture length,
c) potentially reduce an injection rate (which helps contain the fracture growth within the targeted formation) and put away the desired amount of proppant, and
d) reduce a volume of water that is required to create a desired fracture geometry and place the proppant in the fracture.

Using a low polymer concentration (in this case 8 ppt polymer) and uncoated sand but with a specially formulated crosslinking mechanism had a substantial impact on controlling shear degradation of the crosslinked polymer system (as compared to the effects of high shear on the various friction reducers and linear gels that are frequently utilized in a slick water design). The suspension test results are shown in FIG. 6. The reported minimum rpm reflects the degree of dynamic movement necessary to keep the solids in suspension. The proppant is 20/40 uncoated sand.

FIG. 6 verifies the effect (that a representative shear history) has on the ability to transport proppant. In each friction reducer test, the inclusion of a representative shear history resulted in a significant loss of the ability of the friction reducer to contribute to proppant transport. However, a properly formulated low polymer concentration crosslinked fracturing fluid system accomplishes the desired goal of achieving a substantial level of proppant transport despite experiencing a realistic shear history.

For a low polymer concentration polymer crosslinked fracturing fluid system to be suitably effective, initially the crosslinked structure (and its accompanying viscosity increase) should be delayed, but should be established before the fracturing fluid slurry leaves the tubular downhole injection mechanism and heads into the fracture field. In certain embodiments, the crosslinking process is timed to occur in the last 25% of its residence time in the wellbore tube. This would limit the period of high shear that the crosslink structure is exposed to before the crosslinked fracturing fluid enters the relatively low shear environment that is characteristic of a fracturing fluid moving through a created fractured matrix. The crosslinked structure need not be completely formed before the slurry enters the fracture, but the crosslinking process desirably has gone far enough to have already resulted in a substantial increase in viscosity that accompanies the development of the crosslinked structure and the associated contribution to improved proppant transport.

A Mechanism for Preventing Viscosity Degradation

While controlling the rate of crosslinking is certainly an effective way to control the effects of shear degradation of low polymer concentration crosslinked fracturing fluids, it is not likely a total answer. The time a fracturing fluid takes to move through tubular mechanism for injection into a formation, a high shear period, may vary dramatically due to a combination of well depth, lateral length, and pump rate. Thus, to better preserve the proppant transport capabilities of the low polymer concentration crosslinked fracturing fluids, a second mechanism may be incorporated that protects the fracturing fluid system against shear degradation. Shear degradation in certain situations adversely affects the ability for low polymer concentration crosslinked fracturing fluids to maintain viscosity and transport proppant capabilities. The added protection mechanism (when utilizing relatively low TDS water) includes utilizing a mixture of a guar or a guar derivative or a mixture thereof with a high molecular weight anionic polyacrylamide >15 million. The approach was tested using a mixture of guar (4550) and friction reducer (identified as AFRD-12) to achieve the desired combination of rheological properties and proppant transport. When utilizing high TDS water (for the fracturing fluid) it may still be possible to utilize a high molecular weight anionic polyacrylamide but it may be necessary to replace this polyacrylamide with either a cationic, non-ionic or amphoteric polyacrylamide.

Example 5—Maximum Transport Systems

To illustrate this approach, the following tests were performed. The first set of tests (Table I) were performed using an initial 3 minute high shear period to simulate the trip from the surface to the fracture opening, while the second set of tests (Table II) were performed without the initial 3 minute high shear period. These so-called Maximum Transport Systems (MTS™, a trademark of PfP Industries) are fracturing fluids including a mixture of a guar, guar derivative or mixture thereof and a friction reducer (FR) that is crosslinked to achieve maximal proppant transport properties.

TABLE I

Tests of Fracturing Fluids Including a Guar and a Friction Reducer Without an Initial High Shear Period

| Test # | Guar† (ppt) | FR‡ (ppt) | Hydration Viscosity (cP) | Temp (° F.) | n' 3 min | n' 30 min | n' 60 min | Visc @ 100(1/s) cP 3 min | Visc @ 100(1/s) cP 30 min | Visc @ 100(1/s) cP 60 min |
|---|---|---|---|---|---|---|---|---|---|---|
| 23 | 7 | 1 | 5.6 | 75 | 0.5565 | 0.7897 | 0.7835 | 29.5 | 36.68 | 40.16 |
| 24 | 7 | 1 | 5.6 | 120 | 0.2857 | 0.4859 | 0.5424 | 21.79 | 49.29 | 46.71 |
| 25 | 7 | 1 | 5.6 | 120 | 0.2269 | 0.4327 | 0.4822 | 23.85 | 44.51 | 41.39 |
| 28 | 7 | 0 | 4.4 | 75 | 0.4333 | 0.7805 | 0.7935 | 16.19 | 13.04 | 16.33 |
| 29 | 7 | 0 | 4.4 | 120 | 0.3305 | 0.9279 | 1.0106 | 15.2 | 24.91 | 24.58 |
| 30 | 7 | 0 | 4.4 | 120 | 0.3049 | 1.3651 | 1.4849 | 13 | 17.47 | 17.9 |
| 31 | 8 | 0 | 5.0 | 80 | 0.5993 | 0.6097 | 0.7045 | 22.61 | 22.65 | 28.86 |
| 34 | 8 | 0 | 5.0 | 120 | 0.5679 | 0.3507 | 0.2994 | 17.63 | 48.08 | 47.98 |
| 35 | 8 | 0 | 5.0 | 120 | 0.4305 | 0.3180 | 0.3862 | 16.65 | 45.41 | 46.4 | wherein
†4550 Guar is a high viscosity guar gelling agent available from available from PfP Industries and
‡AFRD-12 is a dry anionic high viscosity friction reducer available from PfP Industries.

Looking at Test #24 and Test #34, the data suggests that there is little difference between a 7:1 (guar:FR) mix and just using 8 ppt guar. However, the results may have been influenced by the fact that at 8 ppt of 4550 guar, the fracturing fluid may be getting too close to a concentration of guar that acts more like a conventional crosslinked system. Looking at Test #24 and Test #29, comparing a fracturing fluid based on a 7:1 guar:FR mixture to a fracturing fluid based on a 7:0 guar:FR mixture, the data suggests that the FR is contributing to the viscosity building in an unexpected way. To better characterize the effect of FR on viscosity building, Test #24 and Test #29 were rerun, but without the initial high shear period. If the viscosity is not very different in the two runs, then the result would support the concept that an FR really does not impact the viscosity building or crosslinked viscosity of a fracturing fluid. However, because the original results of Test #24 and Test #29 were so different, it may support the concept that the addition of the selected FR protects a 7 ppt crosslinked guar fracturing fluid from shear degradation.

To see whether a mixture of a guar and a friction reducer in a fracturing fluid has no effect on viscosity building or a marked effect on viscosity building, several of the tests of Table I, where repeated, but without the initial high shear period.

TABLE II

Tests of Fracturing Fluids Including a Guar and a Friction Reducer Without an Initial High Shear Period @ 120° F.

| Test # | Guar† (ppt) | FR‡ (ppt) | Hydration Viscosity (cP) | Buffer (gpt) | DXL-2 (ppt) | n' 5 min | n' 30 min | n' 60 min | Visc @ 100(1/s) cP 5 min | 30 min | 60 min |
|---|---|---|---|---|---|---|---|---|---|---|---|
| 98 | 7 | 0 | 4.2 | 1 | 4.8 | 0.7965 | 0.6101 | 0.6654 | 42 | 38 | 38 |
| 104 | 7 | 1 | 5 | 1 | 4.8 | 0.8942 | 0.5937 | 0.6685 | 69 | 44 | 42 |
| 100 | 8 | 0 | 4.8 | 1 | 4.8 | 1.0118 | 0.3084 | 0.2933 | 69 | 52 | 52 |
| 102 | 8 | 1 | 5.4 | 1 | 4.8 | 0.8345 | 0.4813 | 0.502 | 85 | 70 | 70 | wherein
†4550 Guar is a high viscosity guar gelling agent available from available from PfP Industries and
‡AFRD-12 is a dry anionic high viscosity friction reducer available from PfP Industries.

When looking at Test #24 and Test #29 of Table I, which included a initial high shear period, the 7:1 formulation had approximately twice the viscosity @ 1 hour as did the 7:0 formulation. When looking at Test #98 and Test #104 of Table II, which did not include an initial high shear period, the 7:1 formulation showed about 10% increase in viscosity @ 1 hour compared to 7:0 formulation.

Comparing Test #24 to Test #104 verifies that the inclusion of 1 ppt of the AFRD-12 friction reducer transforms the formulation into a fracturing fluid system that is unaffected by high shear. Test #24 of Table I, which was exposed to an initial high shear period, actually exhibited a higher 60 minute viscosity of 46.7 cP compared Test #104, which was not exposed to the initial high shear period, which had a to 60 minute viscosity of 42 cP.

The results of Test #98 and Test #104 of Table II both showed 60 minute n' values below 0.7, while the results of Test #24 and Test #29 of Table I showed that when the 7:1 formulation (Test #24) is subjected to the initial high shear period, the formulation had a low n' (0.542), while, even though the 7:0 formulation (Test #29) exhibited a 60 minute viscosity >24 cP, its 60 minute n' was >1 (an indication that the fluid may not have the desired crosslinked structure to maximize proppant transport).

The results from Test #100 of Table II compared to Test #34 of Table I confirms that a 8:0 formulation is fairly resistant to shear degradation. The inclusion of the initial high shear period only dropped the 60 minute viscosity reading by ±8%.

Example 6—Dynamic Proppant Transport in a Crosslinked Fracturing Fluid Prepared from High TDS Produced Back Water Base Fluids Having established in Example 2 that the disclosed compositions, systems and methods of this disclosure may generate desired rheological properties using a high TDS produced back water base fluid, it is important to determine if in a low polymer concentration crosslinked fracturing fluid system may exhibit a substantial proppant transport capability even when subjected to a representative shear history and utilizing a high TDS water base fluid. FIG. 7 represents the suspension test results of the low polymer concentration crosslinked fracturing fluid approach and a variety of friction reducers in two different high TDS base fluids. In each case test, the suspension test included a representative shear history.

Clearly the combination of a representative shear history and elevated TDS render all friction reducers incapable of contributing to proppant transport (with the suspension test results being essentially the same as measured with a brine containing no polymer). However, with this test approach, the low polymer crosslinked fracturing fluid system (based on the embodiments, systems and methods of this disclosure) still exhibits a substantial ability to transport proppant.

Example 7—Friction Reduction

There are two more fracturing fluid characteristics that are considered to be important for a low concentration crosslinked polymer fracturing fluid system to exhibit if the system was going to be used in place of a friction reducer polymer in a slick water fracturing fluid. The first such characteristic is drag reduction. The one thing a friction reducer does well is reduce pipe friction that is created when the fracturing fluid and proppant are pumped through injection tubulars.

The conventional industry-accepted way to determine the amount of drag reduction (that a friction reducer may create) is with a device described as a flow or friction loop. An example of such a device is shown in FIG. 8.

The device includes a pump and a length of pipe with pressure taps that have been designed to allow the fluid velocity in the test to be representative of what may be achieved in a fracturing treatment. By monitoring the pressure drop in the test section and comparing the test results of pumping water with and without a friction reduction polymer, one may calculate the expected drag reduction that the addition of a the polymer may achieve.

If a low concentration polymer crosslinked fracturing fluid system is to be effective in replacing a slick water treatment design, it needs to yield similar drag reduction results. FIG. 9 shows the results of a drag reduction test comparing the drag reduction properties of a standard anionic friction reducer, a high molecular/high viscosity friction reducer and the low polymer concentration crosslinked fracturing fluid. All three samples gave between 70% and 75% drag reduction and where stable through the duration of the test cycle.

The present compositions, systems and methods are significantly different than the industry standards which use normal guar and borate based cross-linkers. Our process and chemistry works with a wide range of TDS base fluids that are obtained using a variety of produced waters, flow back waters, frac flow back waters, brine brackish waters, OR waters, or mixtures thereof. In certain embodiments, the base fluids may also include fresh water.

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A fracturing fluid composition comprising:
a base fluid comprising fresh water, an elevated total dissolved solids (TDS) water selected from the group consisting of produced water, flow back water, brackish water, reverse osmosis (RO) reject water, clear brine, or mixtures and combinations thereof,
one or more dry powdered gel-forming hydratable polymers,
a friction reducer composition,
a cross-linking composition in an amount sufficient to crosslink the one or more gel-forming hydratable polymers to form crosslinked structures within the fracturing fluid composition, and
a proppant,
wherein:
the one or more dry powdered gel-forming hydratable polymers are present in an amount of less than about 10 ppt of the fracturing fluid composition,
the friction reducer composition is adapted to reduce drag properties of the fracturing fluid composition and to protect and stabilize the crosslinked structures from shear degradation as the fracturing fluid composition travels down a tubular downhole injection mechanism into subterranean formation fractures forming during fracturing, and
the fracturing fluid composition is adapted to improve proppant transport properties, to control viscosity when the hydrating fluid is a brine or a water having elevated total dissolved solids (TDS), and to increase proppant concentrations within fractures.

2. The composition of claim 1, further comprising:
a first buffer in an amount sufficient to adjust a pH of the fracturing fluid composition to an acidic pH to improve hydration of the hydratable polymers and to prevent premature crosslinking of the gel-forming hydratable polymers for base fluids containing crosslinking ions, wherein the acidic pH is less than or equal to pH 7, and
a second buffer in an amount sufficient to adjust the acidic pH to a final pH at or above pH 9 and sufficient to activate the crosslinking composition to form the crosslinked structures.

3. The composition of claim 1, further comprising:
an amount of a buffer sufficient to adjust a pH of the fracturing fluid composition to a pH at or above 9 and to activate the crosslinking composition to form the crosslinked structures.

4. The composition of claim 1, wherein:
the crosslinking composition is capable of producing the crosslinked structures at an acidic pH, and
the acidic pH is less than or equal to pH 7.

5. The composition of claim 1, wherein the dry powdered gel-forming hydratable polymers are selected from the group consisting of galactomannan gums, glucomannan gums, guars, derivatized guars, cellulose derivatives, and mixtures or combinations thereof.

6. The composition of claim 5, wherein the friction reducer composition comprises:
one or more dry powdered synthetic polymers selected from the group consisting of the partially hydrolyzed polymers and copolymers are selected from the group consisting of hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers of acrylic acid and one or more ethylenically unsaturated monomers, hydrolyzed or partially hydrolyzed copolymers of methyacrylic acid and one or more ethylenically unsaturated monomers, hydrolyzed or partially hydrolyzed copolymers of acrylamide and one or more ethylenically unsaturated monomers and mixtures or combinations thereof, the ethylenically unsaturated monomers including vinyl alcohol, ethylene, propylene, and mixtures or combinations thereof,
one or more dry powdered anionic, cationic, or amphoteric homopolymers, copolymers, terpolymers, or high order mixed monomer polymers synthesized from one or more anionic monomers, cationic monomers, neutral monomers, or mixtures and combinations thereof, the anionic monomers are selected from the group consisting of acrylic acid, methacrylic acid, 2-acrylamide-2-methylpropane sulfonic acid, maleic anhydride, and mixtures or combinations thereof,
the cationic monomers are selected from the group consisting of dimethyl-diallyl ammonium chloride, dimethylamino-ethyl methacrylate, allyltrimethyl ammonium chloride, and mixtures or combinations thereof,
the neutral monomers are selected from the group consisting of butadiene, N-vinyl-2-pyrrolidone, methyl vinyl ether, methyl acrylate, maleic anhydride, styrene, vinyl acetate, acrylamide, methyl methacrylate, acrylonitrile, and mixtures or combinations thereof, and/or
the one or more synthetic polymers and/or the one or more anionic, cationic, or amphoteric homopolymers, copolymers, terpolymers, or high order mixed monomer polymers are also adapted to protect and stabilize the crosslinked structures from shear degradation.

7. The composition of claim 6, wherein the one or more synthetic polymers and/or the one or more anionic, cationic, or amphoteric homopolymers, copolymers, terpolymers, or high order mixed monomer polymers have molecular weights above about 15 million.

8. The composition of claim 1, wherein the crosslinking composition comprises one or more compounds including boron-containing ions, zirconium-containing ions, and titanium-containing ions, or mixtures thereof.

9. The composition of claim 1, wherein the hydratable polymer composition is present in a slurry in an amount between about 1 gpt and about 10 gpt and wherein the one or more synthetic polymers and/or one or more anionic, cationic, or amphoteric homopolymers, copolymers, terpolymers, or high order mixed monomer polymers that have a molecular weight range between about 18 million and about 40 million.

10. A fracturing fluid composition comprising:
a base fluid comprising fresh water, an elevated total dissolved solids (TDS) water selected from the group consisting of produced water, flow back water, brackish water, reverse osmosis (RO) reject water, clear brine, or mixtures and combinations thereof,
one or more dry powdered gel-forming hydratable polymers,
a friction reducer composition comprises one or more synthetic polymers and/or one or more anionic, cationic, or amphoteric homopolymers, copolymers, terpolymers, or higher order mixed monomer polymers,
a cross-linking composition in an amount sufficient to crosslink the one or more gel-forming hydratable polymers to form crosslinked structures within the fracturing fluid composition, and
a proppant including sand, resin-coated sand, sintered bauxite, glass beads, ceramic beads, walnut shell fragments, aluminum pellets, or nylon pellets,
wherein:
the one or more dry powdered gel-forming hydratable polymers are present in an amount of less than about 10 ppt of the fracturing fluid composition,
the friction reducer composition is adapted to reduce drag properties of the fracturing fluid composition and to protect and stabilize the crosslinked structures from shear degradation as the fracturing fluid composition travels down a tubular downhole injection mechanism into subterranean formation fractures forming during fracturing, and
the fracturing fluid composition is adapted to improve proppant transport properties, to control viscosity when the hydrating fluid is a brine or a water having elevated total dissolved solids (TDS), and to increase proppant concentrations within fractures.

11. The composition of claim 10, further comprising:
a first buffer in an amount sufficient to adjust a pH of the fracturing fluid composition to an acidic pH to improve hydration of the hydratable polymers and to prevent premature crosslinking of the gel-forming hydratable polymers for base fluids containing crosslinking ions, wherein the acidic pH is less than or equal to pH 7, and
a second buffer in an amount sufficient to adjust the acidic pH to a final pH at or above pH 9 and sufficient to activate the crosslinking composition to form the crosslinked structures.

12. The composition of claim 10, further comprising:
an amount of a buffer sufficient to adjust a pH of the fracturing fluid composition to a pH at or above 9 and to activate the crosslinking composition to form the crosslinked structures.

13. The composition of claim 10, wherein:
the crosslinking composition is capable of producing the crosslinked structures at an acidic pH, and
the acidic pH is less than or equal to pH 74.

14. The composition of claim 10, wherein the dry powdered gel-forming hydratable polymers are selected from the group consisting of galactomannan gums, glucomannan gums, guars, derivatized guars, cellulose derivatives, and mixtures or combinations thereof.

15. The composition of claim 14, wherein the friction reducer composition comprises:
one or more dry powdered synthetic polymers selected from the group consisting of the partially hydrolyzed polymers and copolymers are selected from the group consisting of hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers of acrylic acid and one or more ethylenically unsaturated monomers, hydrolyzed or partially hydrolyzed copolymers of methyacrylic acid and one or more ethylenically unsaturated monomers, hydrolyzed or partially hydrolyzed copolymers of acrylamide and one or more ethylenically unsaturated monomers and mixtures or combinations thereof,
the ethylenically unsaturated monomers including vinyl alcohol, ethylene, propylene, and mixtures or combinations thereof,
one or more dry powdered anionic, cationic, or amphoteric homopolymers, copolymers, terpolymers, or high order mixed monomer polymers synthesized from one or more anionic monomers, cationic monomers, neutral monomers, or mixtures and combinations thereof,
the anionic monomers are selected from the group consisting of acrylic acid, methacrylic acid, 2-acrylamide-2-methylpropane sulfonic acid, maleic anhydride, and mixtures or combinations thereof,
the cationic monomers are selected from the group consisting of dimethyl-diallyl ammonium chloride, dimethylamino-ethyl methacrylate, allyltrimethyl ammonium chloride, and mixtures or combinations thereof,
the neutral monomers are selected from the group consisting of butadiene, N-vinyl-2-pyrrolidone, methyl vinyl ether, methyl acrylate, maleic anhydride, styrene, vinyl acetate, acrylamide, methyl methacrylate, acrylonitrile, and mixtures or combinations thereof, and/or
the one or more synthetic polymers and/or the one or more anionic, cationic, or amphoteric homopolymers, copolymers, terpolymers, or high order mixed monomer polymers are also adapted to protect and stabilize the crosslinked structures from shear degradation.

16. The composition of claim 15, wherein the one or more synthetic polymers and/or the one or more anionic, cationic, or amphoteric homopolymers, copolymers, terpolymers, or high order mixed monomer polymers have molecular weights above about 15 million.

17. The composition of claim 10, wherein the crosslinking composition comprises one or more compounds including boron-containing ions, zirconium-containing ions, and titanium-containing ions, or mixtures thereof.

18. The composition of claim 10, wherein the hydratable polymer composition is present in a slurry is an amount between about 1 gpt and about 10 gpt and wherein the one or more synthetic polymers and/or one or more anionic, cationic, or amphoteric homopolymers, copolymers, terpolymers, or high order mixed monomer polymers that have a molecular weight range between about 18 million and about 40 million.

19. A method of fracturing a subterranean formation comprising:

pumping a fracturing fluid composition into a tubular downhole injection mechanism and into a formation to produce fractures within the formation,
wherein the fracturing fluid composition comprising:
a base fluid comprising fresh water, an elevated total dissolved solids (TDS) water selected from the group consisting of produced water, flow back water, brackish water, reverse osmosis (RO) reject water, clear brine, or mixtures and combinations thereof,
one or more dry powdered gel-forming hydratable polymers,
a friction reducer composition, and
a cross-linking composition in an amount sufficient to crosslink the gel-forming;
hydratable polymer to form crosslinked structures in the fracturing fluid composition,
wherein:
the one or more dry powdered gel-forming hydratable polymers are present in an amount of less than about 10 ppt of the fracturing fluid composition,
the friction reducer composition is adapted to reduce drag properties of the fracturing fluid composition and to protect and stabilize the crosslinked structures from shear degradation as the fracturing fluid composition travels down a tubular downhole injection mechanism into subterranean formation fractures formed during fracturing, and
the fracturing fluid composition is adapted to improve proppant transport properties, to control viscosity when the hydrating fluid is a brine or a water having elevated total dissolved solids (TDS), and to increase proppant concentrations within fractures.

20. The method of claim 19, further comprising:
adding a proppant to the fracturing fluid composition, and
wherein the pumping generates long narrow fractures in the formation and increases proppant concentrations within the long narrow fractures.

21. The method of claim 19, wherein, in the pumping step, the fracturing fluid composition further comprising:
a first buffer in an amount sufficient to adjust a pH of the fracturing fluid composition to an acidic pH to improve hydration of hydratable polymers and to prevent premature crosslinking of the gel-forming hydratable polymers for base fluids containing crosslinking ions, wherein the acidic pH is less than or equal to pH 7, and
a second buffer in an amount sufficient to adjust the acidic pH to a final pH and to activate the crosslinking composition, wherein the final pH is at or above 9.

22. The method of claim 19, wherein, in the pumping step, the fracturing fluid composition further comprising:
a buffer in an amount sufficient to adjust a pH of the fracturing fluid composition to a final pH and to activate the crosslinking composition to form the crosslinked structure, wherein the final pH is at or above 9.

23. The method of claim 19, wherein, in the pumping step:
the crosslinking composition is capable of producing the crosslinked structures at an acidic pH, wherein the acidic pH is less than or equal to pH 7.

24. The method of claim 19, wherein, in the pumping step:
the dry powdered gel-forming hydratable polymers are selected from the group consisting of galactomannan gums, glucomannan gums, guars, derivatized guars, cellulose derivatives, and mixtures or combinations thereof.

25. The method of claim 24, wherein, in the pumping step, the friction reducer composition comprises:
one or more dry powdered synthetic polymers selected from the group consisting of the partially hydrolyzed polymer and copolymers are selected from the group consisting of hydrolyzed or partially hydrolyzed polyacrylic acid, hydrolyzed or partially hydrolyzed polymethacrylic acid, hydrolyzed or partially hydrolyzed polyacrylamide, hydrolyzed or partially hydrolyzed copolymers of acrylic acid and one or more ethylenically unsaturated monomers, hydrolyzed or partially hydrolyzed copolymers of methyacrylic acid and one or more ethylenically unsaturated monomers, hydrolyzed or partially hydrolyzed copolymers of acrylamide and one or more ethylenically unsaturated monomers and mixtures or combinations thereof,
the ethylenically unsaturated monomers including vinyl alcohol, ethylene, propylene, and mixtures or combinations thereof,
one or more dry powdered anionic, cationic, or amphoteric homopolymers, copolymers, terpolymers, or high order mixed monomer polymers synthesized from one or more anionic monomers, cationic monomers, neutral monomers, or mixtures and combinations thereof,
the anionic monomers are selected from the group consisting of acrylic acid, methacrylic acid, 2-acrylamide-2-methylpropane sulfonic acid, maleic anhydride, and mixtures or combinations thereof,
the cationic monomers are selected from the group consisting of dimethyl-diallyl ammonium chloride, dimethylamino-ethyl methacrylate, allyltrimethyl ammonium chloride, and mixtures or combinations thereof,
the neutral monomers are selected from the group consisting of butadiene, N-vinyl-2-pyrrolidone, methyl vinyl ether, methyl acrylate, maleic anhydride, styrene, vinyl acetate, acrylamide, methyl methacrylate, acrylonitrile, and mixtures or combinations thereof, and/or
the one or more synthetic polymers and/or one or more anionic, cationic, or amphoteric homopolymers, copolymers, terpolymers, or high order mixed monomer polymers have molecular weights above about 15 million, and
wherein the one or more synthetic polymers and/or one or more anionic, cationic, or amphoteric homopolymers, copolymers, terpolymers, or high order mixed monomer polymers are adapted to also protect and stabilize the crosslinked structures from shear degradation.

26. The method of claim 19, wherein, in the pumping step:
the crosslinking composition comprises one or more compounds including metal ions
selected from the group consisting of boron, zirconium, and titanium, and mixtures thereof, and the proppant comprises 20-40 mesh sand.

27. The method of claim 19, wherein, in the pumping step, the hydratable polymer composition is present in a slurry in an amount between about 1 gpt and about 10 gpt and wherein the one or more synthetic polymers and/or one or more anionic, cationic, or amphoteric homopolymers, copolymers, terpolymers, or high order mixed monomer polymers that have a molecular weight range between about 18 million and about 40 million.

* * * * *